(12) United States Patent
Jones et al.

(10) Patent No.: US 11,200,143 B2
(45) Date of Patent: Dec. 14, 2021

(54) SOFTWARE DEVELOPMENT FRAMEWORK FOR A CLOUD COMPUTING PLATFORM

(71) Applicant: FinancialForce.com, Inc., San Francisco, CA (US)

(72) Inventors: Kevin James Jones, Harrogate (GB); Simon Kristiansen Ejsing, Kirkland, WA (US)

(73) Assignee: FinancialForce.com, Inc., San Francisco, CA (US)

( * ) Notice: Subject to any disclaimer, the term of this patent is extended or adjusted under 35 U.S.C. 154(b) by 175 days.

(21) Appl. No.: 16/242,913

(22) Filed: Jan. 8, 2019

(65) Prior Publication Data
US 2020/0218634 A1 Jul. 9, 2020

(51) Int. Cl.
*G06F 11/36* (2006.01)
*G06F 8/41* (2018.01)
*G06F 8/75* (2018.01)
*G06F 8/33* (2018.01)
*G06N 20/00* (2019.01)
*H04L 29/08* (2006.01)

(52) U.S. Cl.
CPC ............ *G06F 11/3604* (2013.01); *G06F 8/33* (2013.01); *G06F 8/427* (2013.01); *G06F 8/433* (2013.01); *G06F 8/437* (2013.01); *G06F 8/75* (2013.01); *G06F 11/3664* (2013.01); *G06N 20/00* (2019.01); *H04L 67/10* (2013.01); *H04L 67/34* (2013.01)

(58) Field of Classification Search
CPC ... G06F 8/33; G06F 8/51; G06F 8/427; G06F 8/43; G06F 8/433; G06F 8/436; G06F 8/437; G06F 11/3604; G06F 11/3664
See application file for complete search history.

(56) References Cited

U.S. PATENT DOCUMENTS

| 5,673,390 | A | * | 9/1997 | Mueller | G06F 11/0724 |
| | | | | | 714/57 |
| 8,032,860 | B2 | * | 10/2011 | Piehler | G06F 40/10 |
| | | | | | 717/110 |
| 10,423,396 | B1 | * | 9/2019 | Yang | G06F 8/315 |
| 2004/0205726 | A1 | * | 10/2004 | Chedgey | G06F 8/71 |
| | | | | | 717/125 |

(Continued)

OTHER PUBLICATIONS

Abstract vs. Concrete Syntax Trees by Eli Bendersky published Feb. 16, 2009 https://eli.thegreenplace.net/2009/02/16/abstract-vs-concrete-syntax-trees (Year: 2009).*

(Continued)

*Primary Examiner* — Joseph O Schell
(74) *Attorney, Agent, or Firm* — Kokka & Backus, PC

(57) ABSTRACT

A technique is described for evaluating code at a local computing device before deploying the code to a cloud computing platform to be compiled. In an example embodiment, class files including the code in a programming language associated with the cloud computing environment are loaded by a local computer system, for example, associated with a software developer. The local computer system then parses the code to identify elements in the code and checks the identified elements. Errors in the code are identified based on the checking and are displayed to a user (e.g., the developer), for example, via a graphical user interface of a code editor application.

21 Claims, 16 Drawing Sheets

(56) References Cited

U.S. PATENT DOCUMENTS

| | | | | |
|---|---|---|---|---|
| 2008/0282175 | A1* | 11/2008 | Costin | G06F 16/972 715/760 |
| 2009/0037933 | A1* | 2/2009 | Chandran | G06F 9/4486 719/315 |
| 2009/0125888 | A1* | 5/2009 | Von Der Ahe | G06F 11/3624 717/129 |
| 2011/0265066 | A1* | 10/2011 | Fee | G06F 16/172 717/139 |
| 2012/0084609 | A1* | 4/2012 | Tkachuk | G06F 11/3696 714/48 |
| 2015/0331701 | A1* | 11/2015 | Man | G06F 9/4552 717/148 |
| 2016/0239509 | A1* | 8/2016 | Ahuja | G06F 16/14 |
| 2016/0350084 | A1* | 12/2016 | Waggoner | G06F 8/34 |
| 2018/0157479 | A1* | 6/2018 | Zhou | G06F 8/36 |
| 2018/0321918 | A1* | 11/2018 | Mcclory | H04L 63/0281 |
| 2020/0097389 | A1* | 3/2020 | Smith | G06F 11/3636 |

OTHER PUBLICATIONS

Example: How to use Objects in Apex published Jan. 15, 2015 by SFDC99.com https://www.sfdc99.com/2015/01/15/example-how-to-use-objects-in-apex/ (Year: 2015).*

MultiThreading with the Actor Model by CoastRD.com historical version published Apr. 13, 2014 found via the WayBack Machine https://web.archive.org/web/20140413175210/http://www.coastrd.com/multithreading-with-the-actor-model (Year: 2014).*

Wikipedia's Language Server Protocol historical version published Nov. 8, 2018 https://en.wikipedia.org/w/index.php?title=Language_Server_Protocol&oldid=867837725 (Year: 2018).*

Static analysis of program source code using EDSA by Vanek Proceedings. Conference on Software Maintenance—1989 https://ieeexplore.ieee.org/stamp/stamp.jsp?tp=&arnumber=65209&tag=1 (Year: 1989).*

* cited by examiner

FIG. 6

SOFTWARE DEVELOPMENT FRAMEWORK FOR A CLOUD COMPUTING PLATFORM

TECHNICAL FIELD

This application relates to computer programming, and more particularly to a technique for locally evaluating code before deploying the code to a cloud computing platform for compiling.

BACKGROUND

Cloud platforms, such as the Salesforce™ platform, allow for sharing processing resources and data in a multi-tenant network that offers computing services on demand to customers. More generally, cloud computing enables ubiquitous, on-demand access to a shared pool of configurable computing resources (e.g., networks, servers, storage, applications, and services), which can be rapidly provisioned and released with minimal management effort. The Salesforce™ platform may provide numerous companies with an environment to deploy applications that provide an interface for case management and task management, and a system for automatically handling events.

BRIEF DESCRIPTION OF THE DRAWINGS

FIG. 6 is a screen capture that shows an example portion of transpiled code;

DETAILED DESCRIPTION

Overview

Some cloud platforms, such as the Salesforce™ platform, enable developers to create add-on applications that are built on the underlying functionality of the platform. For example, the Salesforce™ platform includes services that are accessible to developers to facilitate development and deployment of add-on applications and websites that are hosted on the Salesforce™ platform and available for use by end users. The process of developing such add-on applications typically involves a developer uploading their code to the cloud platform where it is compiled, checked for errors (as part of the compiling), and hosted for others to access. The term "code" in this context refers to code written in a human-readable programming language (as opposed to machine-readable language). This is sometimes referred to as "source code."

Figure 2:
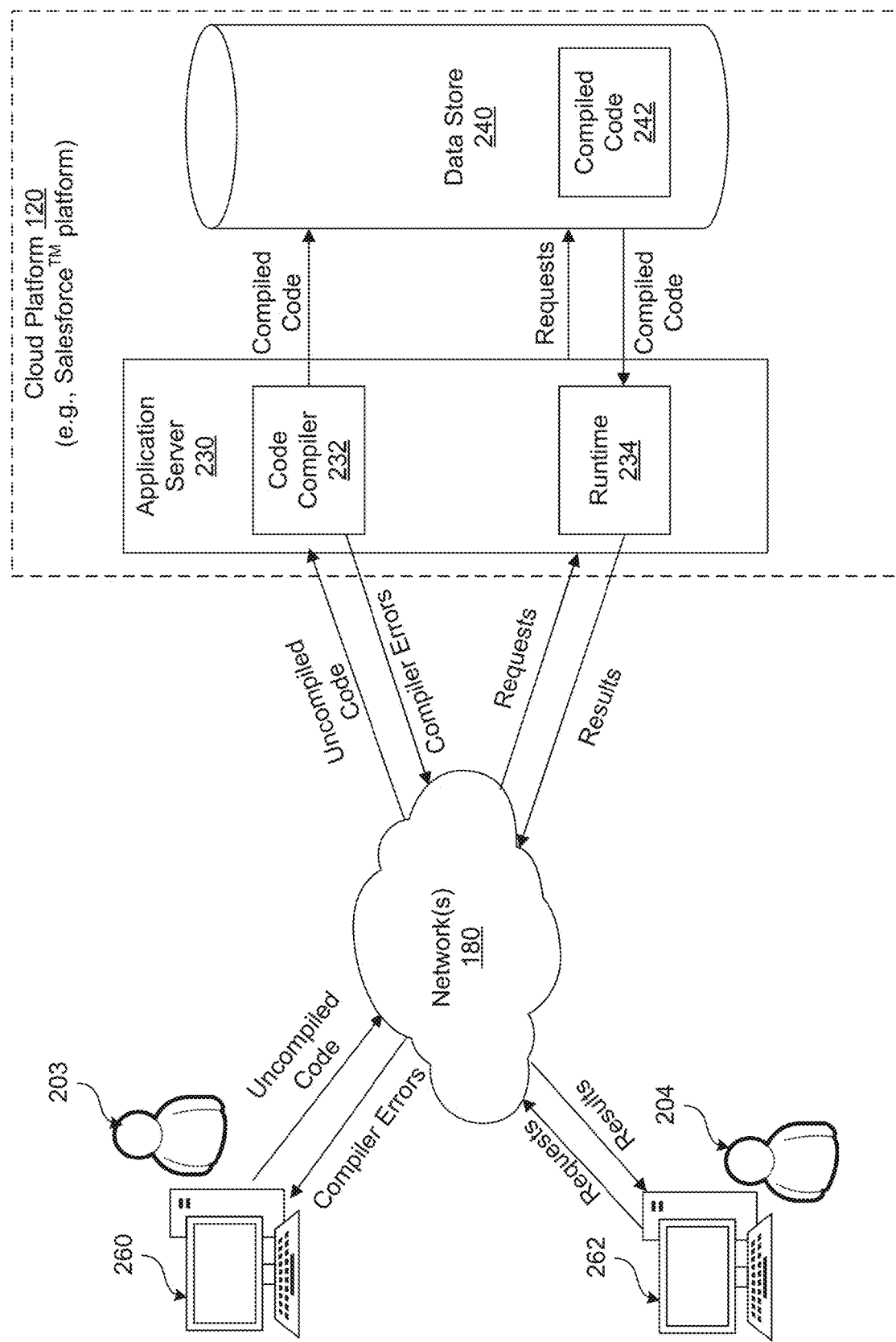
FIG. 2 is an architecture flow diagram that illustrates an example development cycle for add-on applications that are built on a cloud computing platform.

Compile-time error checking at the cloud platform presents a number of challenges from a software development standpoint, particularly where development relies on a language and other development tools that are proprietary to the cloud platform. For example, applications created for the Salesforce™ platform are typically developed using Apex™, a proprietary coding language of the Salesforce™ platform. For various reasons, Apex™ does not support comprehensive local code-base error checking at the developer's device meaning that most tool processing occurs at compile time once the developer's code is uploaded to the cloud platform. In other words, each time a developer uploads a version of their code, they may receive in return one or more compiler errors based, for example, on issues in the code (e.g., syntax errors, type errors, dependency errors, etc.), issues with the cloud-based compiler, missing resources (e.g., missing data sources, code packages, etc.), or any other problems identified at the time of compiling. FIG. 2 (described in more detail later) illustrates an example development cycle for add-on applications that are built on a cloud platform.

Reliance on compile time error checking at the cloud platform can have significant negative impacts on the application development cycle. Developers that are new to a given cloud platform struggle to work out a correct order to serialize code changes to avoid deployment failures and will frequently fall back on a slow "deploy all" strategy to make progress. Such a strategy slows the development progress markedly by consuming mental bandwidth and injecting time delays. More experienced developers can learn certain techniques to make changes to codebases efficiently but tend to aggressively minimize the number of code changes when implementing features to reduce the likelihood of deployment failure. Over time, this minimization of code changes tends to have a negative impact on the quality of the resulting code since necessary refactoring is often avoided.

Introduced herein is a technique for error checking code during development of applications for a cloud platform that addresses the issues described above. The introduced technique represents a technological improvement in cloud-based computing, specifically in the area of tools for developing cloud-computing applications. Certain embodiments address the issues with the prior art to improve development efficiency and improve developer experience by enabling the following:

Local code evaluation: Certain embodiments of the introduced technique enable much of the tool processing associated with code evaluation (e.g., error checking) to be performed locally at a device or system of devices associated with the developer instead of primarily relying on code evaluation at the cloud platform. Local code evaluation reduces delays due to deployment failure, provides more stable response times, and enables customized and complex analysis such as a whole code-base error reporting.

Packaged scope: Certain embodiments of the introduced technique narrow the scope of consideration when performing some code evaluation which alleviates the need to synchronize developer workspaces against an entire organizational account (e.g., Salesforce™ Organization or "org") when evaluating code. For example, a function call in a piece of code to a class that is not in a current codebase can be identified as an unknown instead of a dependency error during code evaluation. References to dependent packages may be resolved against a packaged build artifact to allow cross-package resolution.

Operating Environment

Figure 1:
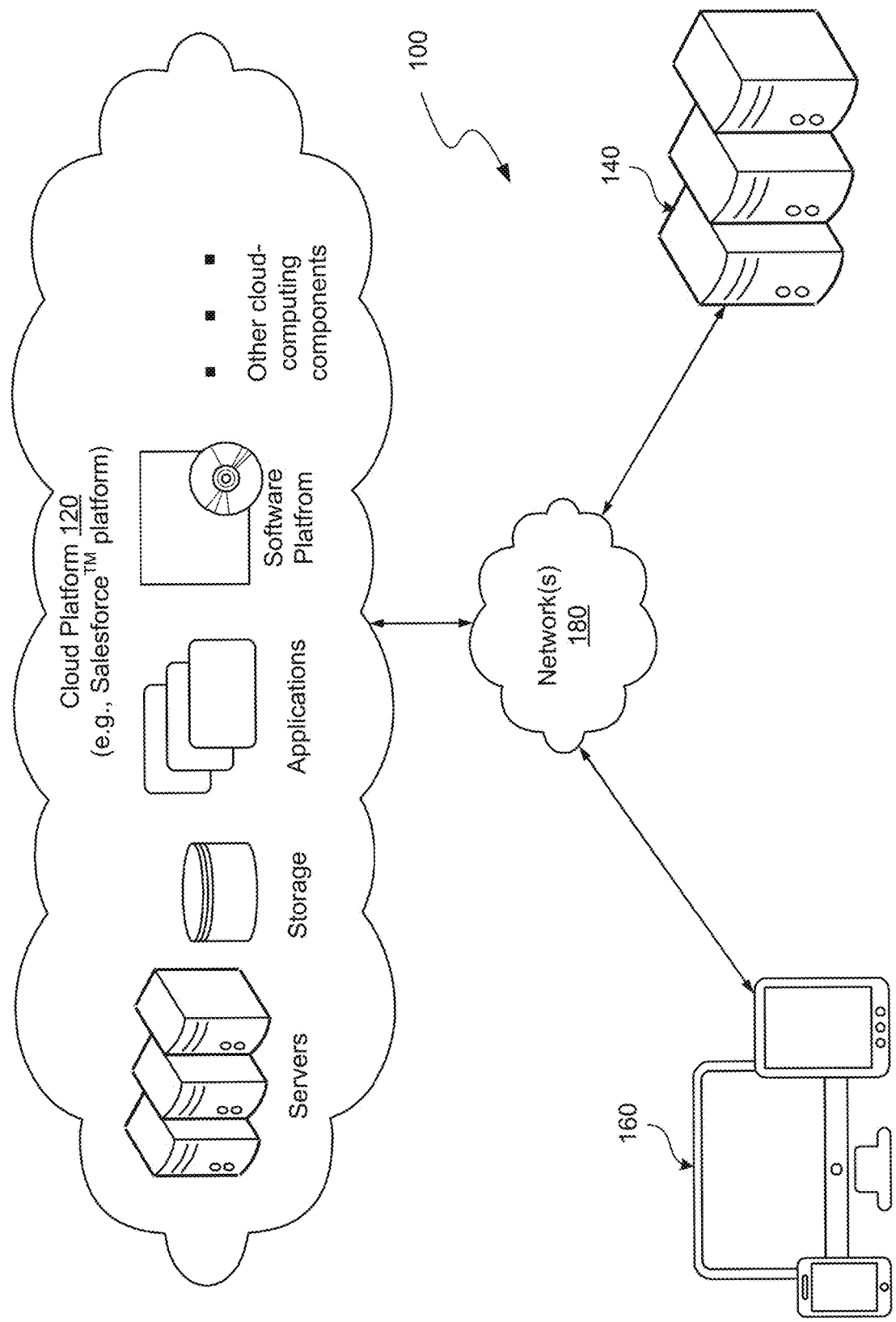
FIG. 1 is a block diagram of an example operating environment with which an embodiment of the introduced technique can be implemented.

FIG. 1 is a block diagram of an example operating environment 100 with which the introduced technique can be implemented. The example environment 100 includes a cloud platform 120 (e.g., the Salesforce™ platform) (also referred to as a "cloud computing platform"), one or more service provider servers 140 that use cloud-based services to provide add-on applications, and one or more client devices 160 that use the add-on applications, all of which are interconnected over a network 180, such as the Internet, to provide processing of a large volume of data.

The network 180 may include any combination of private, public, wired, or wireless portions. Data communicated over the network 180 may be encrypted or unencrypted at various locations or along different portions of the network 180. Each component depicted in the example operating environment 100 may include combinations of hardware and/or software to process data, perform functions, communicate over the network 180, and the like. For example, any component in the example operating environment 100 may include a processor, memory or storage, a network transceiver, a display, an operating system (OS), and application software (e.g., for providing a user portal), and the like. Other components, hardware, and/or software included in the system 100 are well known to persons skilled in the art and, as such, are not shown or discussed herein.

The cloud platform 120 can provide access to a shared pool of configurable computing resources, including servers, storage, applications, a software platform, networks, services, and the like, accessed by the service provider servers 140 to offer add-on applications to the client devices 160. The cloud platform 120 (e.g., Salesforce™ platform) supports multiple tenants and may be referred to as a platform as a service (PaaS).

The PaaS can be accessible to developers for creating the add-on applications that run on the components of the cloud platform 120. Developers can include third-party developers that do not own, operate, provide, or otherwise manage the cloud platform 120. For example, the Salesforce™ platform includes a PaaS called Force.com that is accessible to developers to simplify the development and deployment of add-on applications and websites that are hosted on the Salesforce™ platform and available for use by end users. Such add-on applications can provide, for example, subscription billing services to end users using the client devices 160. Such subscription billing services may be provided by servers 140 associated with a service provider and include applications built on the underlying functionality of the cloud platform 120.

The service provider servers 140 may include any number of server computers that provide the services associated add-on applications such as subscription billing services, which allow businesses to automatically bill their customers for goods or services on a pre-arranged schedule. In some embodiments, service provider servers 140 may be associated with one or more different third-party service providers that do not own, operate, manage, or otherwise provide the cloud platform 120. For example, Salesforce™ may provide cloud platform 120 while one or more different entities provide services via add-on applications using service provider servers 140. Although shown separately from the cloud platform 120, the service provider servers 140 may be included in the cloud platform 120.

The service provider servers 140 may provide or administer a user interface (e.g., website) accessible from the client devices 160. The user interface may include features such as dashboard analytics to provide insight into how a business is performing. Examples of businesses that could benefit from subscription billing services range from software as a service (SaaS) providers to energy and utilities companies.

In some embodiments, the add-on applications provided by service provider services 140 are built using one or more programming languages that are particular to the cloud platform 120. For example, Force.com™ applications are typically built using Apex™ (a proprietary programming language for Force.com™ that is similar to Java™) and Visualforce™ (a proprietary framework for Force.com™ for developing customized user interfaces). The code used to build add-on applications may include functions that are accessible by the add-on applications.

Development Cycle for Add-on Applications to a Cloud Platform

FIG. 2 is a block diagram that illustrates an example development cycle for add-on applications that are built on a cloud platform 120 (e.g., Salesforce™ platform). As depicted in FIG. 2, a developer 203 (e.g., a third-party developer) can utilize a developer computing device or system 260 (e.g., similar to client device 160) to write code for an add-on application that is to be built upon the cloud-platform 120. As previously discussed, the add-on application may be created by developer 203 to provide services to end users 204 via service provider servers 140.

In some cases, the developer 203 may utilize specific development tools such as a proprietary programming language that is particularly suited for developing applications based on the cloud platform 120. In the example case of the Salesforce™ platform, a developer 203 would likely utilize Apex™ to write the code for the add-on application. Apex™ is a programming language that uses Java-like syntax and acts like database stored procedures. Apex™ may enable the developer 203 to add business logic to system events, such as button clicks, updates of related records, and Visualforce™ pages.

In some cases, code created using the proprietary language of the cloud platform 120 is saved, compiled, and executed at the cloud platform 120. For example, as depicted in FIG. 2, code written by developer 203 at the developer computer system 260 using the proprietary language (e.g., Apex™) is transmitted by the developer computer system 260 via network 180 to the cloud platform 120 for compiling. Specifically, the uncompiled code may be transmitted to an application server 230 associated with the cloud platform 120 where it is then compiled by a code compiler process 232 executing at the application server 232. The code compiler 232 may compile the code written by the developer 203 into an abstract set of instructions that can be understood by a runtime interpreter process 234.

These instructions (i.e., the compiled code 242) can be stored as metadata in a data store 240 associated with the cloud platform 120 to be accessed by end users 204 seeking to access the functionality of the add-on application. For example, in some embodiments, an end user 204 may input a request to access an add-on application created by developer 203 and hosted by the cloud platform 120. The end user's 204 request may be entered using an end user computing device 262 (e.g., similar to client device 160) and transmitted, via network 180, to the cloud platform 120. Specifically, the request from the end user 104 may be received by a runtime interpreter process 234 that interprets the request, accesses the instructions based on the request (i.e., compiled code 242 stored in data store 240), processes the instructions based on the request, and returns results based on the request. The results may be returned to the end user 204, for example, as data transmitted by the application server 230 to the end user computing device 262 via network 180. Notably, in some embodiments, application server 234 may actually be a third-party service provider server 140 that is configured to access the instructions (i.e., compiled code), process the instructions and return results to the end user 204.

The code compiler 232 may perform various code evaluation processes such as error checking as part of the compiling process to identify compiler errors or other issues that are due, for example, to errors in the uncompiled code and/or the compiler 232 itself. Error checking may include, for example, syntax checking, type checking, reference/dependency checking, and any other similar error checking procedures. If the code compiler 232 identifies any compiler errors, the code compiler 232 will return the compiler errors to the developer 203, for example, by transmitting data, via network 180, to the developer computer system 260. As previously discussed, it is the interruption in developer flow caused by code evaluation at the cloud platform 120 that the introduced technique aims to address.

Improved Application Development Framework for a Cloud Platform

Figure 3:
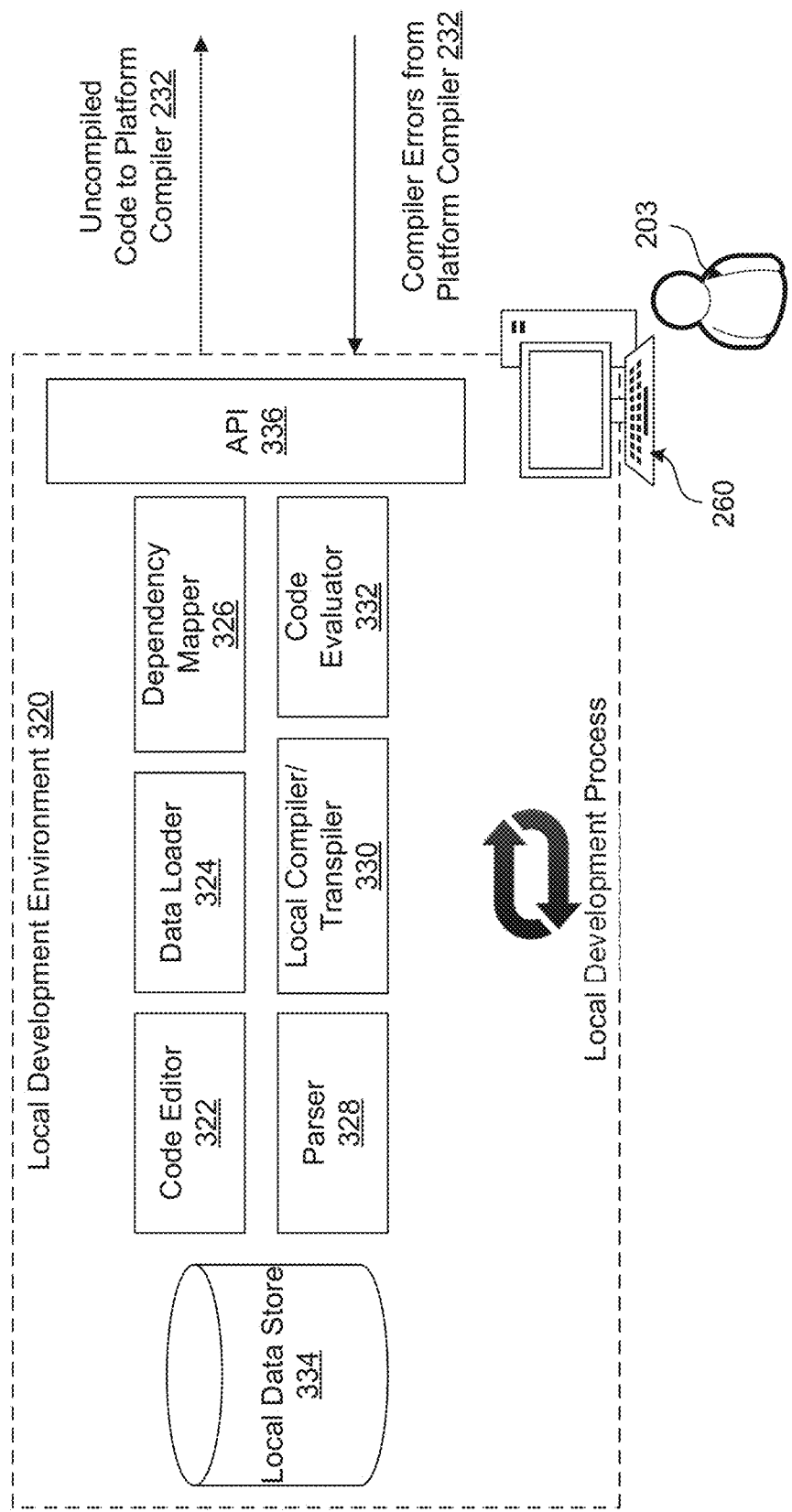
FIG. 3 is a block diagram showing various components of a local development environment with which an embodiment of the introduced technique can be implemented.

FIG. 3 shows a block diagram illustrating various components of a local development environment 320. As previously discussed, certain embodiments of the introduced technique may include local evaluation of code meaning tool processing at a local computing device or system associated with a developer 203 such as a developer computer system 260. As shown in FIG. 3, the local development environment may include various development tools such as a code editor 322, a data loader 324, a dependency mapper 326, a code parser 328, a compiler/transpiler 330, a code validator 332, and other tools (not shown). The local development environment 320 may also include a local data store 334, for example, for storing project files. Further, the local development environment 320 may be configured for communication with the cloud platform 120, for example, to deploy code and receive compiler errors, using an application program interface (API) 336.

The code editor 322 is a text editor program configured to allow a developer user 203 to create and edit the code for a computer program such as an add-on application to be deployed to the cloud platform 120. The code editor 322 may be a stand-alone application or be built into an integrated development environment (IDE) that includes other development tools. In some embodiments, the code editor may be accessible via a web browser.

The code editor 322 may generate a graphical user interface (GUI) that is then presented to a developer user 203 via a developer computer system 260. The GUI presented by the code editor may include various functionality to assist in the editing of code by the developer user 203 such as syntax highlighting, indentation, autocomplete, brace matching, etc. The GUI of the code editor 322 may also provide convenient access to other tools associated with the local development environment 320 such as a compiler/transpiler 330, debugger, interpreter, etc. Examples of code editors include Microsoft Visual Studio Code™ (VSC), Apple Xcode™, Atom™, and Notepad++™.

The data loader 324 may manage a process of loading classes, for example from a local data store 334 and/or a cloud data store 240, and maintaining a view of the metadata within a given project. In some embodiments, the data loader 334 may be configured to load project metadata incrementally and/or on demand so that other features of the local development environment (e.g. code validation features) can be utilized to detect errors as soon as possible.

The dependency mapper 326 manages a process to analyze a portion of code to identify and map the external dependencies associated with the portion of code. For example, in a given codebase, one class may call a function that is defined in another class. In other words, the one class includes a call function or field reference that depends from another class. The dependency mapper 326 will analyze the code included in the two classes to identify this dependency and document the dependency, for example, by building a data structure such as a code map or call graph. In some embodiments, data generated by the dependency mapper 326 (e.g., a dependency map) is utilized by other tools associated with the local development environment 320 to local code analysis functionality such as exposing code dependencies via the GUI of the code editor 322.

The parser 328 manages a process to analyze portions of code to identify elements within the portions of code using rules associated with the code language. Typically, the input to the parser 328 will include the text of the code. The parser 328 then performs various analysis such as lexical analysis and syntactic analysis to identify elements in the code (e.g., statements, variables, identifiers, literals, operators, etc.) and generates an output indicative of those identified elements (e.g., a parse tree). Examples of parsers that may be implemented include ANTLR (Another Tool for Language Recognition), JavaCC (Java Compiler Compiler), GNU Bison, or any other appropriate parser. In some embodiments, data generated by the parser 328 (e.g., a parse tree) is utilized by other tools associated with the local development environment 320 to enable local code validation functionality such as syntax checking, type checking, reference/dependency checking, etc.

The local compiler/transpiler 330 manages a process for compiling code locally at the developer computer system 260. In some embodiments, a compiler 330 may compile code in the language utilized at cloud platform 120. However, as previously described, some cloud platforms 120 such as the Salesforce™ platform may be configured to utilize a proprietary language such as Apex™ and may further be configured to require compiling at the cloud platform 120 (i.e., remote from the developer computer system 260). In such embodiments, the compiler/transpiler 330 may include functionality for transpiling code written by a developer 203 in one language into a different language. For example, as previously mentioned, Apex™ shares many similarities with Java™. Accordingly, if local compiling of Apex™ code for a project is not possible or practical, a transpiler 330 may be configured to transpile code written by a developer 203 in Apex™ into Java™ code. In some embodiments, the transpiling of Apex™ code into Java™ code may enable local execution in a Java-equivalent runtime and debugging of the code prior to deployment to the cloud platform 120. Although the transpiling of Apex™ code into Java™ code is provided for illustrative purposes, a person having ordinary skill in the art will recognize that the compiler/transpiler 330 may be configured to transpile different types of code depending on the architecture and other requirements of the cloud platform 120.

Code evaluator 332 manages a process for evaluating code locally at the developer computer system 260, for example, prior to deployment to the cloud platform 120. In conjunction with the other components of the local development environment 320, the code evaluator 332 may evaluate the code written by the developer 203, for example, by performing various error checking such as type checking, syntax checking, reference checking, etc. As mentioned, processing associated with this evaluation is performed locally at the developer computer system 260 to improve the overall development flow, for example, by reducing delays due to deployment failure, providing more stable response times, and enabling customized and complex analysis such as a whole code-base error reporting.

In some embodiments, code evaluation is performed in real-time or near real-time as data associated with a given project is loaded. For example, as will be described in more detail, as project files are loaded, the code evaluator 332 may continually perform various checking processes to identify errors and expose those errors to a developer 203 via a GUI of some type. In some embodiments, errors identified by the code evaluator 332 can be presented to the developer 203 via a GUI associated with the code editor 322 in a manner that allows the developer to easily identify the portions of the code causing the identified errors and edit those portions of the code to correct the identified errors. Examples of various GUI features related to the code evaluation are shown and described with respect to FIGS. 11A-11D and 12.

The one or more components of the local development environment 320 may include any combination of hardware and/or software to perform. Further, the components of the local development environment 320 described with respect to FIG. 3 are examples provided for illustrative purposes and are not to be construed as limiting. Other local development environments may include fewer or more components that are depicted in FIG. 3 or may organize the components differently that are depicted in FIG. 3. For example, certain components shown in FIG. 3 may be grouped into a single logical component in other embodiments. In some embodiments, functionalities performed by the one or more components of the local development environment may be represented in instructions that are stored in memory and executed using a processor, for example, as described with respect to the example computer system 1300 of FIG. 13.

In some embodiments, certain functionalities associated with the introduced technique may be implemented as a language server for use with the code editor 322, for example, to allow those functionalities to be utilized with published extensions associated with the cloud platform 120. One goal of implementing a language server architecture is to allow certain language-specific support functionalities to be implemented and distributed regardless of the code editor 322 or IDE utilized.

Figure 4:
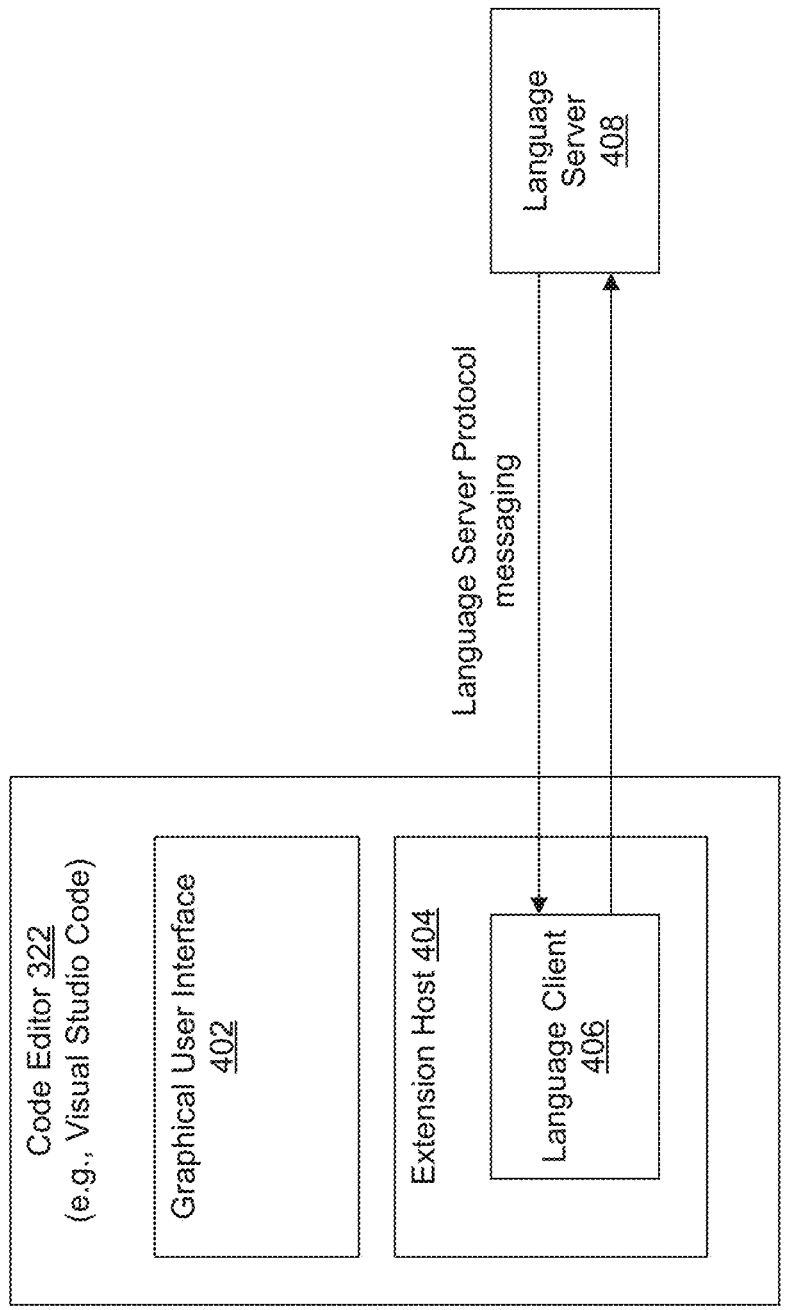
FIG. 4 is a block diagram showing an example language server architecture with which an embodiment of the introduced technique can be implemented.

FIG. 4 shows a block diagram illustrating an example architecture for implementing a language server to expand the functionality of a code editor 322 such as Visual Studio Code™ with certain functionalities described herein. As shown in FIG. 4, the code editor 322 includes an extension host 404 running a language client 406 that communicates with a language server 408 using a communication protocol such as the Language Server Protocol (LSP). The language client 406 may be any type of extension associated with the code editor 322 such as a standard Visual Studio Code™ extension or an extension associated with the cloud platform 120. The language server 408 represents a code analysis tool running as a separate process to expand the functionality of the code editor 322, for example, by presenting identified errors via a GUI 402 associated with the code editor 322.

The communication protocol (e.g., LSP) defines the messages that are exchanged between the language client 406 and language server 408. Messages may include requests by the client 406 to the language server 408, for example, in the form of a remote procedure call encoded as a JavaScript Object Notation (JSON) file. The messages may also include responses by the language server 408 to the requests by the language client 406. Messages may also include other bidirectional notification between the language client 406 and language server 408 to implement functionalities associated with the introduced technique.

Figure 5:
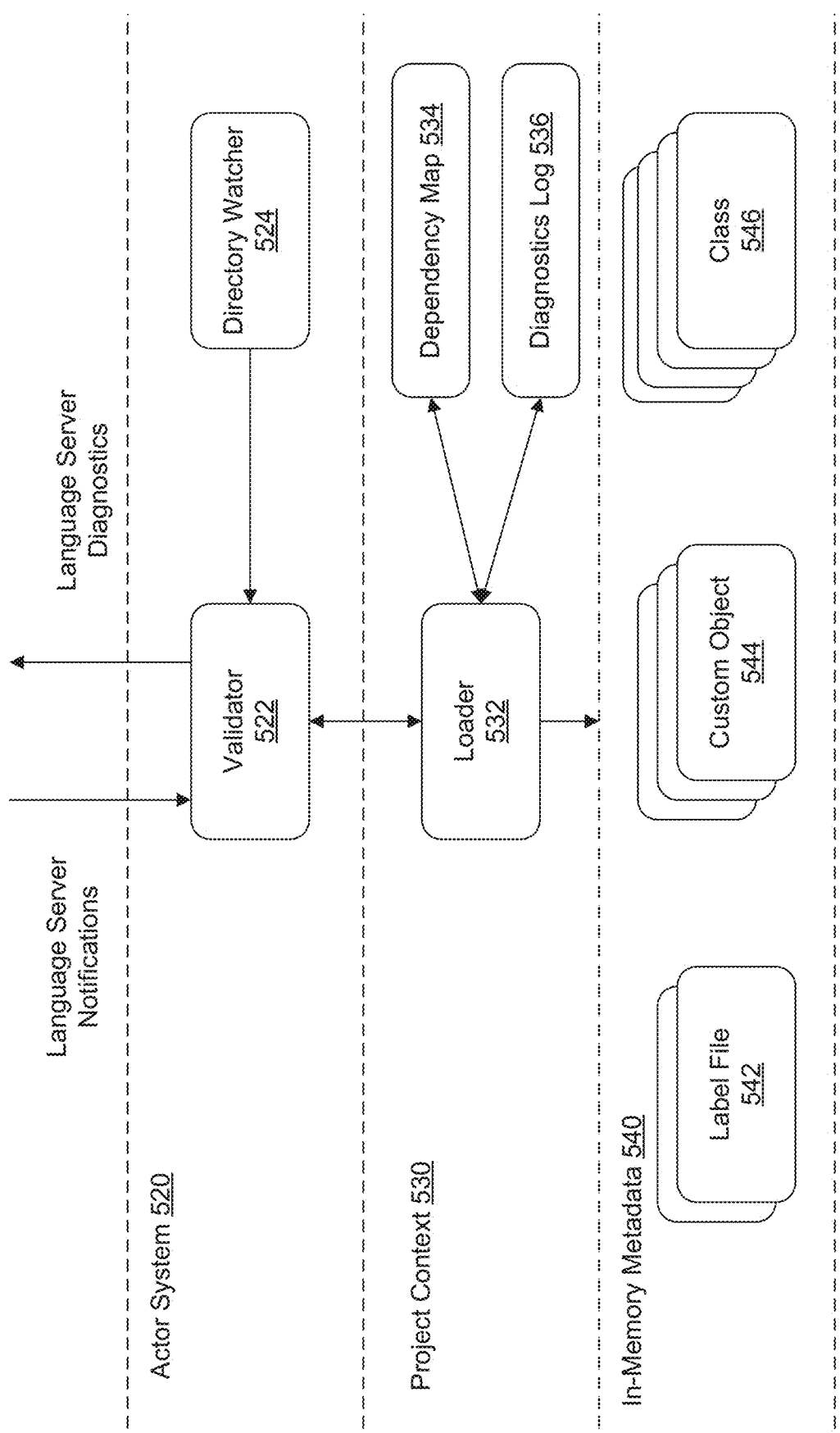
FIG. 5 is an architecture flow diagram that illustrates an example local code evaluation process, according to an embodiment of the introduced technique.

FIG. 5 shows a flow diagram illustrating an example approach for implementing certain functionalities associated with the introduced technique. As previously mentioned, in some embodiments, a code evaluator tool 332 can be implemented as a language server for use with an existing code editor 322 such as Visual Studio Code™. The internal code defining the code evaluator tool 332 can be structured around an actor model to aid in supporting the asynchronous nature of LSP to support background processing. Background processing allows the code evaluator 332 to be responsive to deployment activity in the code editor 322 while simultaneously ensuring that project-wide errors and other warnings remain up-to-date based on the state of the codebase.

The components of the flow diagram depicted in FIG. 5 are organized into several tiers such as an actor system 520, a project context tier 530, and the underlying data including in-memory metadata 540. The underlying in-memory metadata 540 of a given project may include one or more label files 542, one or more custom objects 544, one or more classes 546 (e.g., Apex™ classes) as well as other data.

In the project context tier 530, a loader 532 manages the process of loading data (e.g., classes) associated with a given project from the in-memory metadata tier 540 in order to maintain the current view of the data associated with the project. In some embodiments, the loader 532 is configured to load project metadata incrementally on demand so that validation features can be utilized as soon as the language server implementing the evaluator tool 332 starts.

In embodiments implemented for use with the Salesforce™ platform (i.e., for use with Apex™ code), the parser 328 may utilize ANTLR grammar created with certain modifications from the Java™ 6 ANTLR grammar. Modifications to the grammar utilized by the parser 328 may be aimed at making the grammar less strict or to account for discrepancies between the languages. By making the grammar less strict, the overall code evaluation process can be improved by avoiding error messages and/or file rejections for trivial issues identified during parsing.

In a second phase of the multi-phase process for class loading, type checking is performed on classes that have been loaded. In some embodiments, type checking is performed once the external references in the target class(es) have also been loaded. The loader 532 may orchestrate the handling of this by ensuring all required classes have been loaded before initiating the second phase type-checking across any newly loaded, refreshed, or invalidated classes. By-products of the second phase type checking process may include reporting errors to the code editor 332 (e.g., as a diagnostics log 536) and/or generating or updating a dependency map 534. In some embodiments, the diagnostics log(s) 536 and dependency map 534 may be utilized to guide future class invalidations.

Above the project context tier 530 is an actor system 520 that includes one or more actors such as a validator actor 522 and a directory watcher 524. An "actor" in this context includes any type of object that encapsulates state and behavior and is configured to communicate with other actors to perform tasks using messaging. For example, actors may be conceptualized as entities that can be assigned tasks and grouped into organized structures to oversee certain functionalities. In some embodiments, the actor system 520 depicted in FIG. 5 may be implemented using Akka™ which is an open source framework that provides for distributed parallel processing of actor tasks.

In some embodiments, the validator 522 performs various processes to check the validity or syntactical correctness of portions of project code in response to language server notifications of changes made to the portions of code. For example, based on the information provided by the loader 532, one or more validator actors 522 may analyze the code to identify errors in the code such as type errors, syntax errors, reference errors, etc. In the context of the Salesforce™ platform, the one or more validators 522 may be configured as Apex™ validators to analyze the developer's 203 code for correctness according to Apex™ requirements.

In some embodiments, the validator 522 maintains a low priority background work queue for the loader 532 which is primed from a list of the class files in a given project so that projects can be quickly loaded after startup of the language server. New work arising from the code editor 322 can be prepended to this work queue while re-validation actions, for example based on edits to files, are postpended to the work queue.

In some embodiments, the validator 522 may respond to other language server protocol messages. For example, messages that indicate if additional information should be displayed alongside the Apex™ source code to aid developers 203 in understanding what external classes are uses by the Apex™ source code.

In some embodiments, the directory watcher 524 provides additional messages to the validator 522 indicating when changes have been directly made to the project code so as to augment the information being provided by the language server. For example, the directory watcher 522 may indicate to the validator 522 when a project file has been deleted even if the language server is not reporting such file change messages.

Transpiling Apex Code to Java Code

As previously mentioned, in some embodiments, the local development environment includes a transpiler 330 configured to transpile code in one language to another language. In the Salesforce™ platform as the cloud platform 120, transpiling functionality would likely involve transpiling Apex™ code into Java™ code, for example, to enable local execution and debugging of the code written in Apex™. Even if local execution of transpiled Java™ code does not always allow for full fidelity with a Salesforce™ org, it is contemplated that the ability to write and execute unit tests of sufficiently encapsulated business logic contained in the code will produce results that indicate, at a high level of confidence, how the business logic will later perform when executed in a real Salesforce™ org. Accordingly, this local execution of transpiled Apex™ code can provide valuable insight to a developer 203 into how an add-on application will perform when deployed before actually deploying the Apex™ code.

In some embodiments, local execution of a local version of an application may be performed using a hybrid approach in which the majority of the execution occurs locally at the developer computer system 260 while certain operations are performed remotely at the cloud computing platform and configured to mimic local execution. As an illustrative example, portions of code in a first language such as Apex™ are transpiled to generate code in a second language such as Java™, which can execute database operations at the cloud computing platform 120. For example, the database operations may be executed against an org at the Salesforce™ platform. The results of these operations are marshaled into Java™ classes that mimic sObjects in Apex™.

Figure 6:
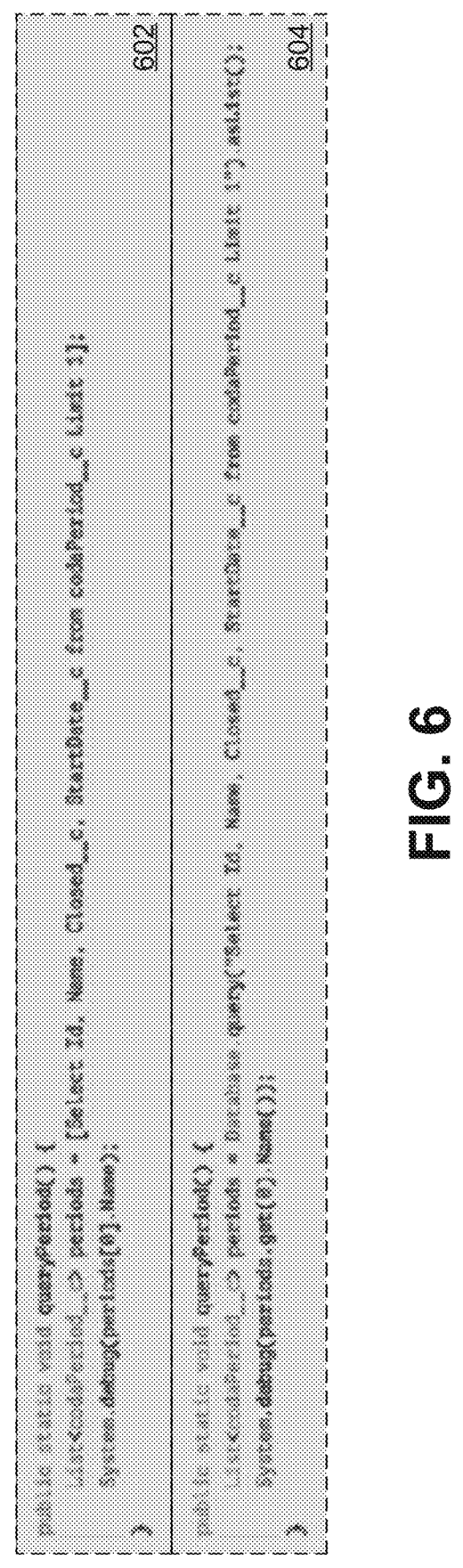

FIG. 6 depicts an example portion of Apex™ code 602 and an example portion of Java™ code 604 that was generated based on the portion of Apex™ code 602. When executed, the database.query code in this example handles connecting to a Salesforce™ org and running the query. The results of the query are marshaled into the "codaPeriod_c" Java™ class which is automatically generated from the custom object metadata file. Notably, the ".asList" call has a generic implementation and the Java compiler is using type inference (e.g., based on the syntax of the Apex™ code 602) to bridge the gap in converting the results of the database call into the correct list type. This demonstrates that intelligent use of language features, in this case in Java™, can be used to make adoption of alternatives more viable.

Example Processes

Figure 7:
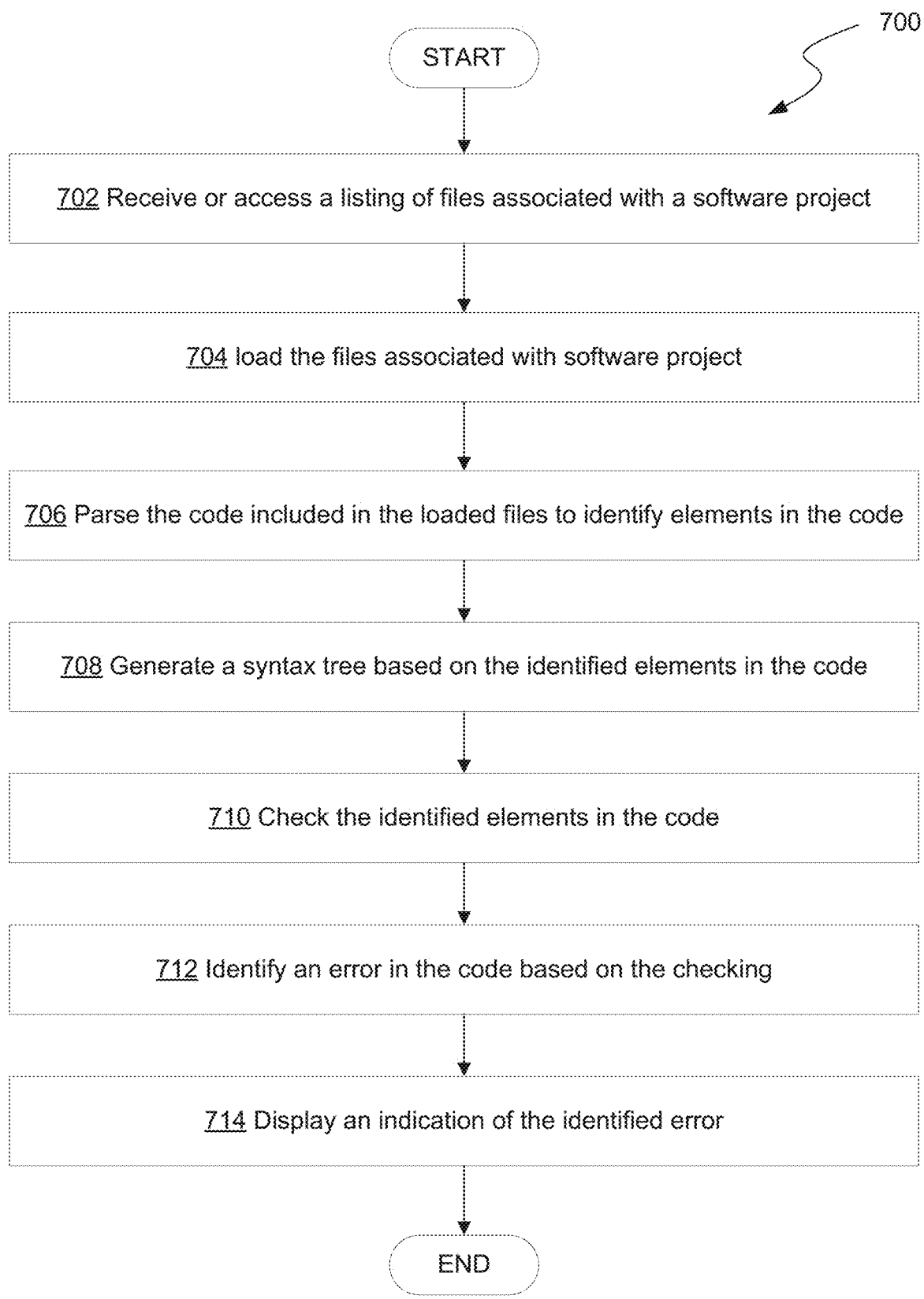
FIG. 7 is a flow diagram that describes an example process for locally evaluating code prior to deploying the code to be compiled at a cloud computing platform, according to an embodiment of the introduced technique.

FIGS. 7-10 show flow diagrams of several example processes according to the introduced technique. One or more steps of the example processes depicted in FIGS. 7-10 may be performed by any one or more of the components of the example computer system 1300 described with respect to FIG. 13. For example, the example process 700 depicted in FIG. 7 may be represented in instructions stored in memory that are then executed by a processing unit. As previously mentioned, the computer system performing one or more of the steps of example process 700 may be developer computer system 260 associated with a developer 203 of an add-on application based on the cloud computing platform 102. In other words, one or more of the steps of example process 700 may be performed "locally" at a developer computer system 260 as opposed to "remotely" at the cloud computing platform 102. In specific certain embodiments, the example process 700 is performed by a code analysis tool that expands the functionality of a code editor application 322. In such embodiments, the code analysis tool may be specifically implemented as a language server 408 that communicates with an extension 404 to the code editor application 322 using messages according to a language server protocol. The process 700 described with respect to FIG. 7 is an example provided for illustrative purposes and is not to be construed as limiting. Other processes may include more or fewer steps than depicted while remaining within the scope of the present disclosure. Further, the steps depicted in example process 700 may be performed in a different order than is shown.

FIG. 7 shows a flow diagram of an example process 700 for locally evaluating code prior to deploying the code to be compiled at a cloud computing platform 120.

Example process 700 begins at step 702 with receiving or otherwise accessing a listing of files associated with a software development project. As previously mentioned, the project may be the development of an add-on application based on the cloud computing platform 120. The files associated with the software development project may include class files, object files, label files, or any other data or metadata associated with the project.

In some cases, the files included in the listing may represent less than all of the files necessary to compile and/or execute the final software product (e.g., an add-on application). In other words, the code included in the files may represent only a portion of the total codebase utilized to compile and/or execute the final software product. This may be due to the fact that at least a portion of the codebase is from the cloud computing platform 120 and for any number of reasons is not accessible to the computing device performing the local code evaluation (e.g., developer computer system 260).

Example process 700 continues at step 704 with loading one or more of the files included in the listing. For example, as described with respect to FIG. 5, files may be loaded by one or more loaders 532 that are configured to incrementally load such files and maintain a current view of the data associated with the project. The files loaded at step 704 may include the code (e.g., source code) to be evaluated. The code to be evaluated is in a programming language associated with the cloud computing platform 120. For example, as previously mentioned, if the cloud computing platform is the Salesforce™ platform, the programming language may be Apex™, which is proprietary to the Salesforce™ platform.

Example process 700 continues at step 706 with parsing the code in the loaded files to identify a plurality of elements in the code. For example, a parser 328 may perform various analysis (e.g., lexical analysis and syntactic analysis) of the text of the code using certain grammatical rules to identify elements in the code such as statements, variables, identifiers, literals, operators, etc.

In some embodiments, in conjunction with the parsing at step 706, example process 700 may include at step 708 with generating a syntax tree based on the identified plurality of elements in the code. For example, a parser 328 may generate AST and, in some embodiments, convert the AST into a CST.

Example process 700 continues at step 710 with checking the identified elements in the code, for example, by analyzing the syntax tree. Checking at step 710 may include syntax checking, type checking, reference/dependency checking, and any other similar error checking procedures. In some embodiments, code included in the files (e.g., class files) is checked in real time or near real time as the files are incrementally loaded.

Example process 700 continues at step 712 with identifying an error in the code based on the checking. For example, a validator 522 may utilize various project context information such as a dependency map 534 and/or a diagnostics log 536 resulting from the checking by the loader 532 to identify an error in the code. Identified errors in the code may include, for example, type errors, syntax errors, reference errors, or any other issues.

Example process 700 concludes at step 714 with displaying an indication of the identified error, for example to a developer 203 that is creating and editing the code. In some embodiments, step 714 includes causing a separate application such as a code editor application 322 to display the indication of the error, for example, via a GUI 402. This indication of the error can be displayed, via such a GUI 402, in real time or near real time as the error is identified so that a developer user 203 can identify the source of the error and edit the text of the code (e.g., using the GUI 402 of the code editor 322) to correct the error.

As previously discussed, a code analysis tool performing one or more of the steps of process 700 may be implemented as a language server. In such embodiments, step 714 may include the language server transmitting a message (e.g., according to a language server protocol) that includes the indication of the error to an extension of the code editor application 322. Based on the transmitted message, the extension may cause the indication of the identified error to be displayed in the GUI 402 of the code editor 322.

As described in more detail later with respect to FIGS. 11A-11D, a GUI 402 for the code editor 322 may include multiple interactive elements such as a text editor element configured to display text of the code and receive user input to enter and/or edit the text of the code, a file explorer element configured to display an interactive listing of the one or more files including the code; and an error reporting element configured to display an interactive listing of identified errors in the code. In some embodiments, step 714 may include, for example, graphically highlighting a portion of the code that has caused the error in an interactive text field of the text editor element of the GUI 402. Alternatively, or in addition, step 714 may include graphically highlighting an identifier of a particular file (e.g., a class file) that includes the portion of the code that has caused the error in the interactive listing of the file explorer element of the GUI 402. Alternatively, or in addition, step 714 may include displaying a description of the identified error as an entry in the interactive listing of the error reporting element of the GUI 402.

As previously mentioned, type checking at step 710 may result in certain by-products such as diagnostics logs or dependency maps. In particular a generated dependency map can be utilized for dependency tooling to provide information to the developer 203 regarding certain dependencies between files associated with a given project. For example, if one file references a class that is defined in another file, this dependency can be presented to a developer 203 to aid in his or her development process. This may be particularly helpful for a developer 203 who is working with a large codebase without any type of package/module structure.

Figure 8:
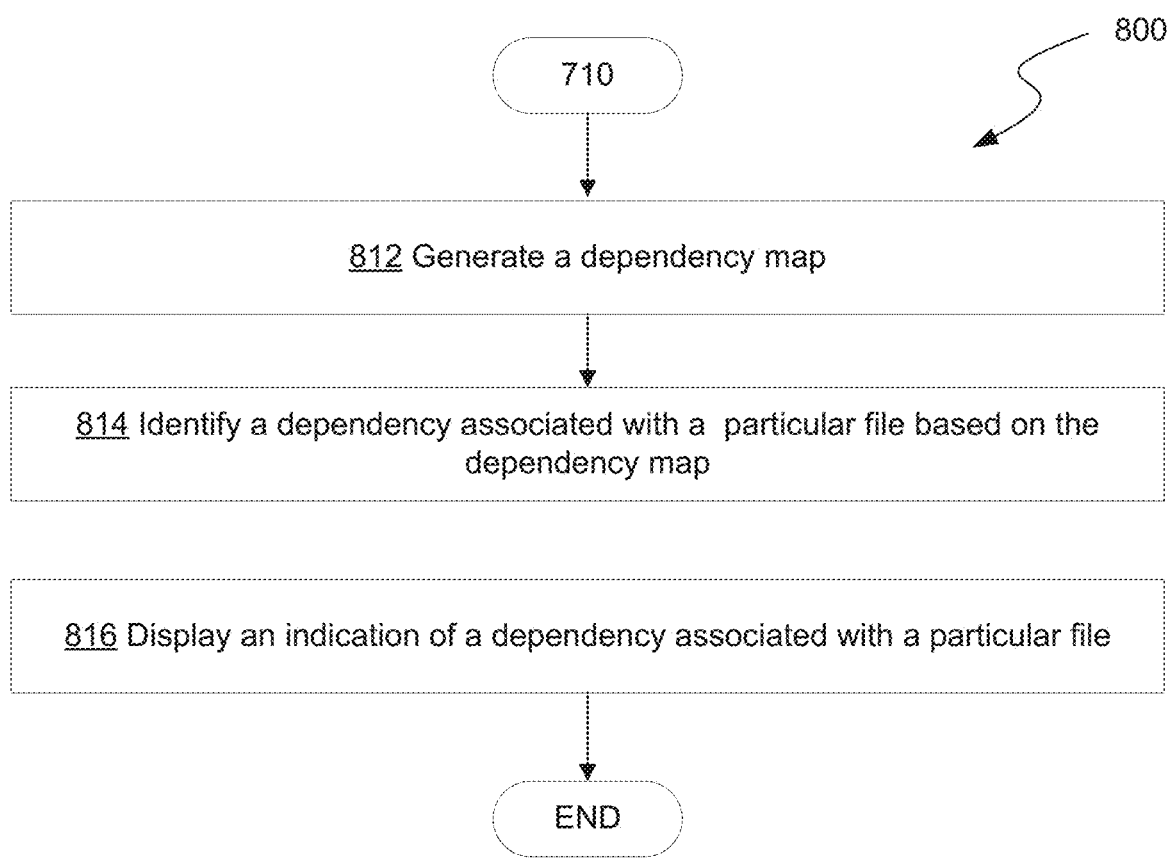
FIG. 8 is a flow diagram that describes an example process for dependency tooling, according to an embodiment of the introduced technique.

FIG. 8 shows a flow diagram of an example process 800 for dependency tooling that continues from step 710 of example process 700 depicted in FIG. 7. In an example embodiment, process 800 continues from step 710 with, at step 812, generating a dependency map associated with one or more files based, for example, on the data generated during checking process when loading the project files. Example process 800 then continues at step 814 with identifying a dependency associated with a particular file based on the generated dependency map. Example process 800 then continues at step 816 with displaying an indication of the identified dependency.

As with the indication of an identified error, the indication of a dependency can be displayed via a GUI 402 of a code editor application 322. For example, FIG. 12, described in more detail later, shows an example screen of a GUI 402 that displays dependency information.

Where implemented as a language server, step 816 may include the language server transmitting a message (e.g., according to a language server protocol) that includes the indication of the identified dependency to an extension of the code editor application 322. Based on the transmitted message, the extension may cause the indication of the identified dependency to be displayed in the GUI 402 of the code editor 322.

Figure 9:
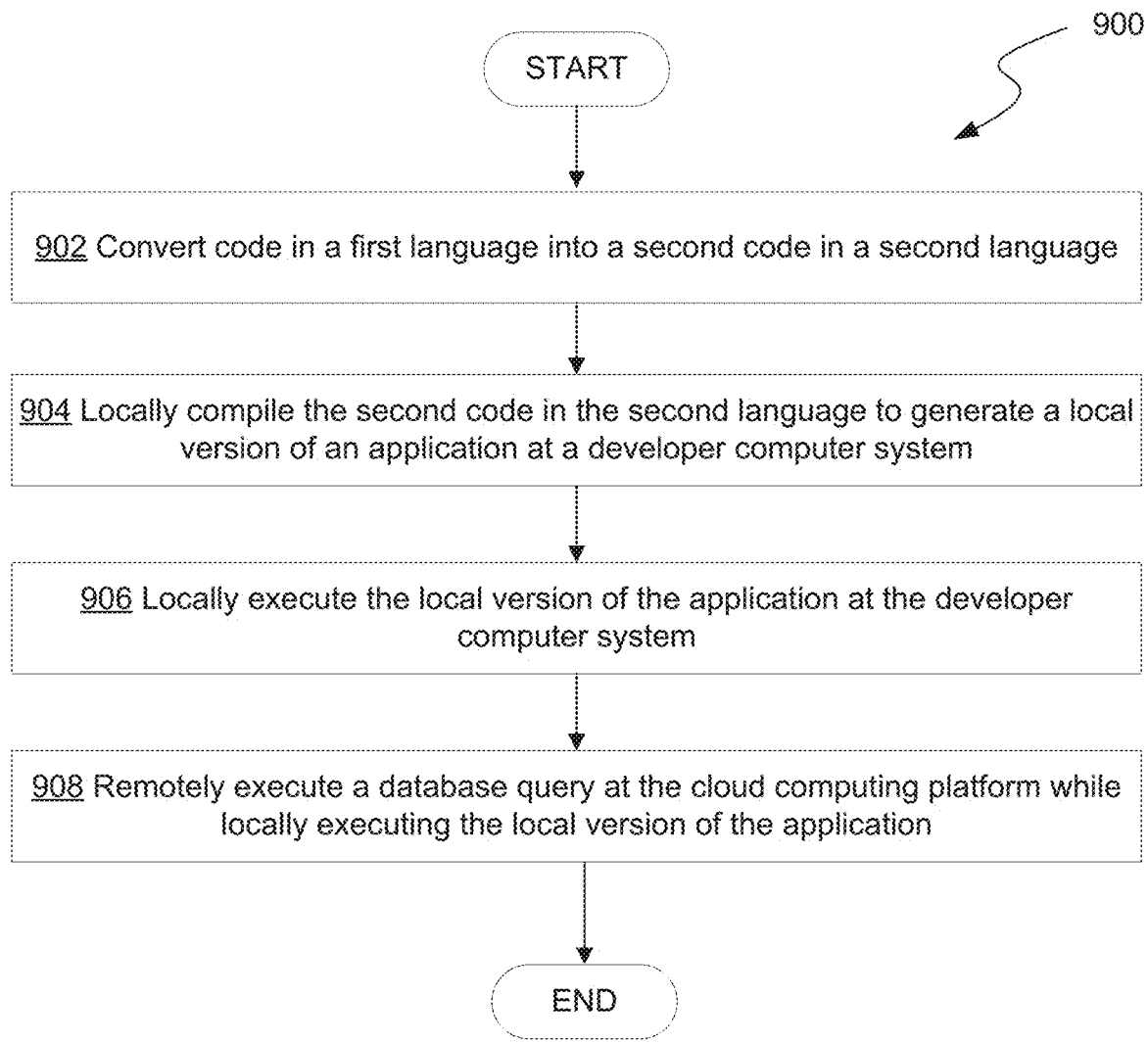
FIG. 9 is a flow diagram that describes an example process for transpiling code for local execution, according to an embodiment of the introduced technique.

FIG. 9 shows a flow diagram of an example process 900 for transpiling code to perform a hybrid approach to local execution.

The example process 900 begins at step 902 with transpiling the code included, for example, in the files loaded at step 704 in example process 700. Specifically, step 902 involves processing the code in a first language (e.g., Apex™) to convert that code into a second code in a second language (e.g., Java™) that is different from the first language.

Step 902 may be performed if the initial first language of the code is in a language that is proprietary to the cloud computing platform 120, such as Apex™, and where the resources needed to compile the code (e.g., a cloud compiler 232) are not available to a developer computer system 260.

Step 902 may involve transpiling the code into a second language, such as Java™, which can be compiled, at step 904, for example using a local compiler 330, to generate a local version of the application being developed.

This local version of the application can then be executed at step 906, for example, to perform debugging, or test certain business logic associated with the application. In some embodiments, local execution of the local version of an application may be performed using a hybrid approach in which certain operations, such as a database query, are executed remotely at the cloud computing platform 120. The results of such operations can then be marshaled into Java™ classes that mimic sObjects in Apex™.

As previously discussed, after performing a local code evaluation process, the code is then deployed to the cloud computing platform 120 for compiling, for example, by compiler 232. Despite the local evaluation process, in some embodiments, errors may still be identified at compile-time by the cloud compiler 232. When such compiler errors are identified, they may be transmitted back to the developer computer system 260, for example, via a computer network. In some embodiments, compiler errors received from the cloud computing platform 120 can be utilized to improve the local evaluation process.

Figure 10:
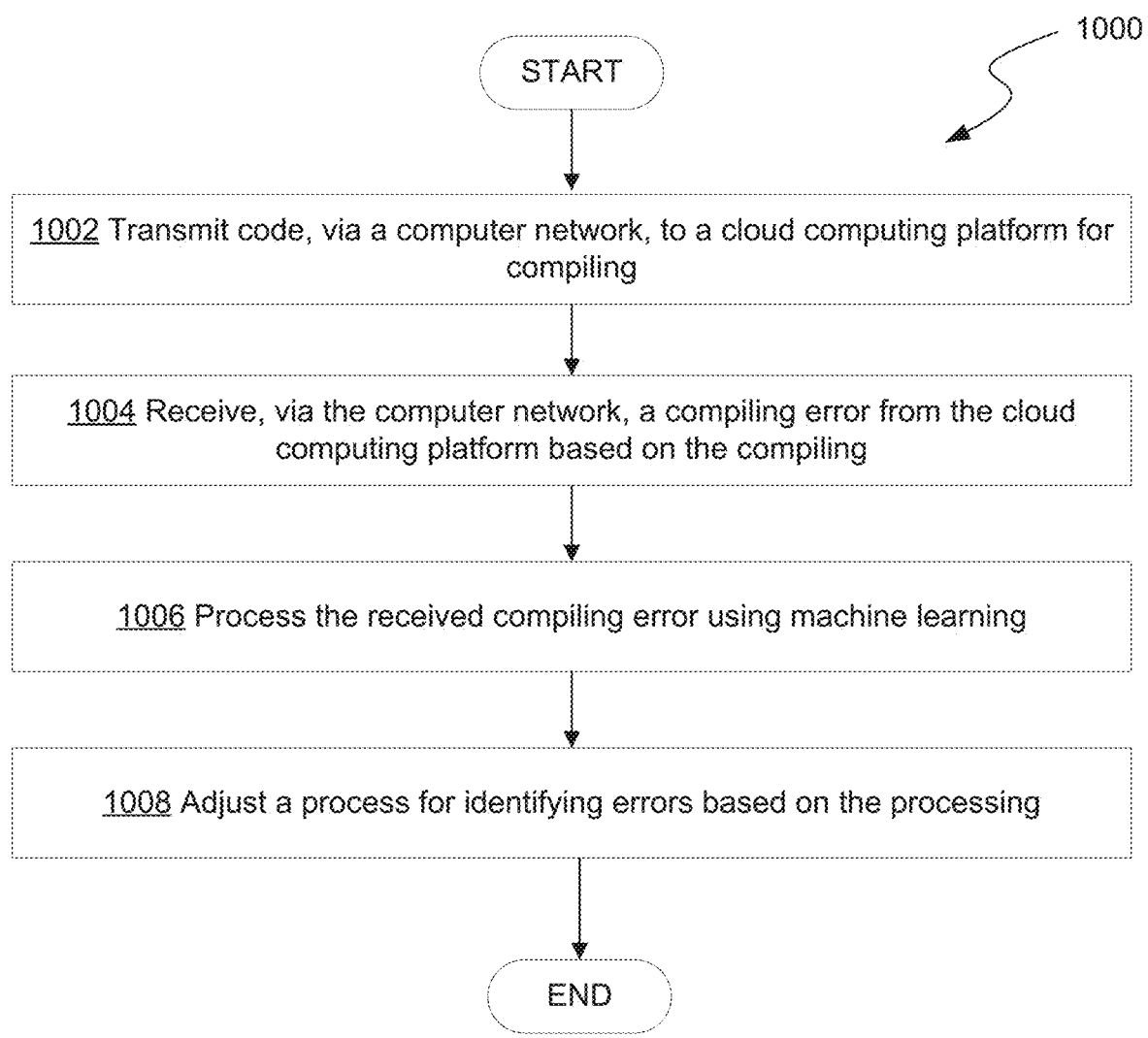
FIG. 10 is a flow diagram that describes an example process for improving a local code evaluation process using compiler errors received from a cloud computing platform, according to an embodiment of the introduced technique.

FIG. 10 shows a flow diagram for an example process 1000 for improving a local code evaluation process using compiler errors received from the cloud computing platform 120.

Example process 1000 begins at step 1002 with transmitting, via a computer network, the code to the cloud computing platform 120 for compiling.

Example process 1000 continues at step 1004 with receiving, via the computer network, a compiling error identified, for example, at compile-time by the cloud compiler 232.

Example process 1000 continues at step 1006 with processing the received compiling error using machine learning. For example, a code analysis tool may process compiler errors using machine learning to learn or infer types in the code that are otherwise unknown to the code analysis tool. The machine learning may be supervised or unsupervised. Examples of machine learning algorithms applied that may include linear regression, logistic regression, decision tree, k-means, Naïve Bayes, Random Forest, neural network, or any other type of appropriate machine learning process.

Example process 1000 concludes at step 1008 with adjusting a process for identifying errors based on the processing at step 1006. For example, step 1008 may include adjusting one or more parameters in an algorithm for identifying errors applied, for example, at step 712 in example process 700. As an illustrative example, an algorithm for identifying errors may initially be configured not to identify an error based on a certain unknown type included in the code. However, that algorithm may be adjusted if, following the processing of compiler errors, the system makes an inference regarding that otherwise unknown type. In the adjusted state, the algorithm may cause an error to be identified if, based on the interference, the type included in the code is incorrect.

Example Graphical User Interface—Invalidation

FIGS. 11A-11D show a series of screens of a GUI 402 associated with a code editor 322 that illustrate an example user interaction with the code evaluator tool 332 performing a local invalidation process on a portion of code.

Figure 11A:
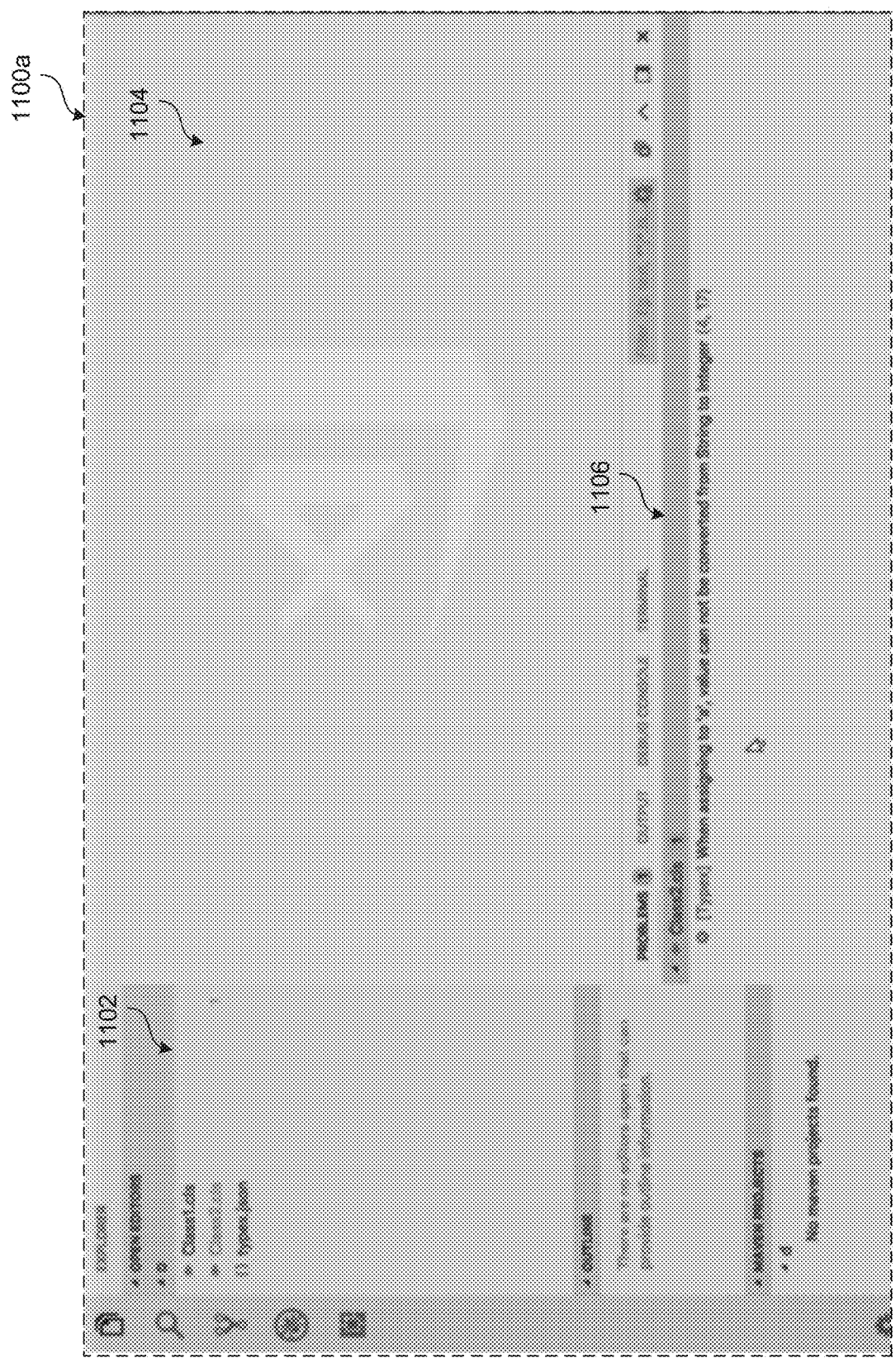
FIGS. 11A-11D are a series of screen captures of an example graphical user interface (GUI) that illustrate an example user interaction with a code evaluator tool performing invalidation on a portion of code, according to an embodiment of the introduced technique.

FIG. 11A shows a first screen 1100a of a GUI 402 that a developer user 203 may be presented with when opening a code editor 322 application to work on a portion of code, for example, associated with an add-on application to be deployed at a cloud platform 120. As shown in FIG. 11A, the GUI 402 may include a file explorer element 1102 that displays a listing of the various files associated with the project. In this simplified example, the two files include only two classes: "Class1.cls" and "Class2.cls." The GUI also includes a text editor element 1104 through which the developer user 203 can input and edit code text. The GUI also includes an error reporting element 1106 that displays a listing of errors identified in the code based on the introduced technique. As previously discussed, in some embodiments, the code evaluation tool 332 that is identifying the errors that are displayed in the error reporting element 1106 may be implemented as a language server that extends the capabilities of the code editor 322.

In the example screen 1100a depicted in FIG. 11A, the error reporting element 1106 is displaying an indication that one error has been identified. Specifically, the identified error is a type error due to an improper conversion from an integer value to a string value in the loaded classes. As shown in FIG. 1A, the indication of the error may include a textual description of the error, but alternatively or in addition may include other such indicating elements such as a graphical indication of the error, etc. Further, the file explorer element 1102 may be updated to reflect identified errors in one or more of the files associated with a given project. For example, as shown in FIG. 11A, the file explorer element 1102 includes a "1" next to the identifier "Class2.cls" which indicates that the code evaluator tool 332 has identified an error in that class. Although not depicted in FIG. 11A, the class identifier may also be graphically altered (e.g., by highlighting in a specific color) to indicate an identified error or other issue in that class.

Figure 11B:
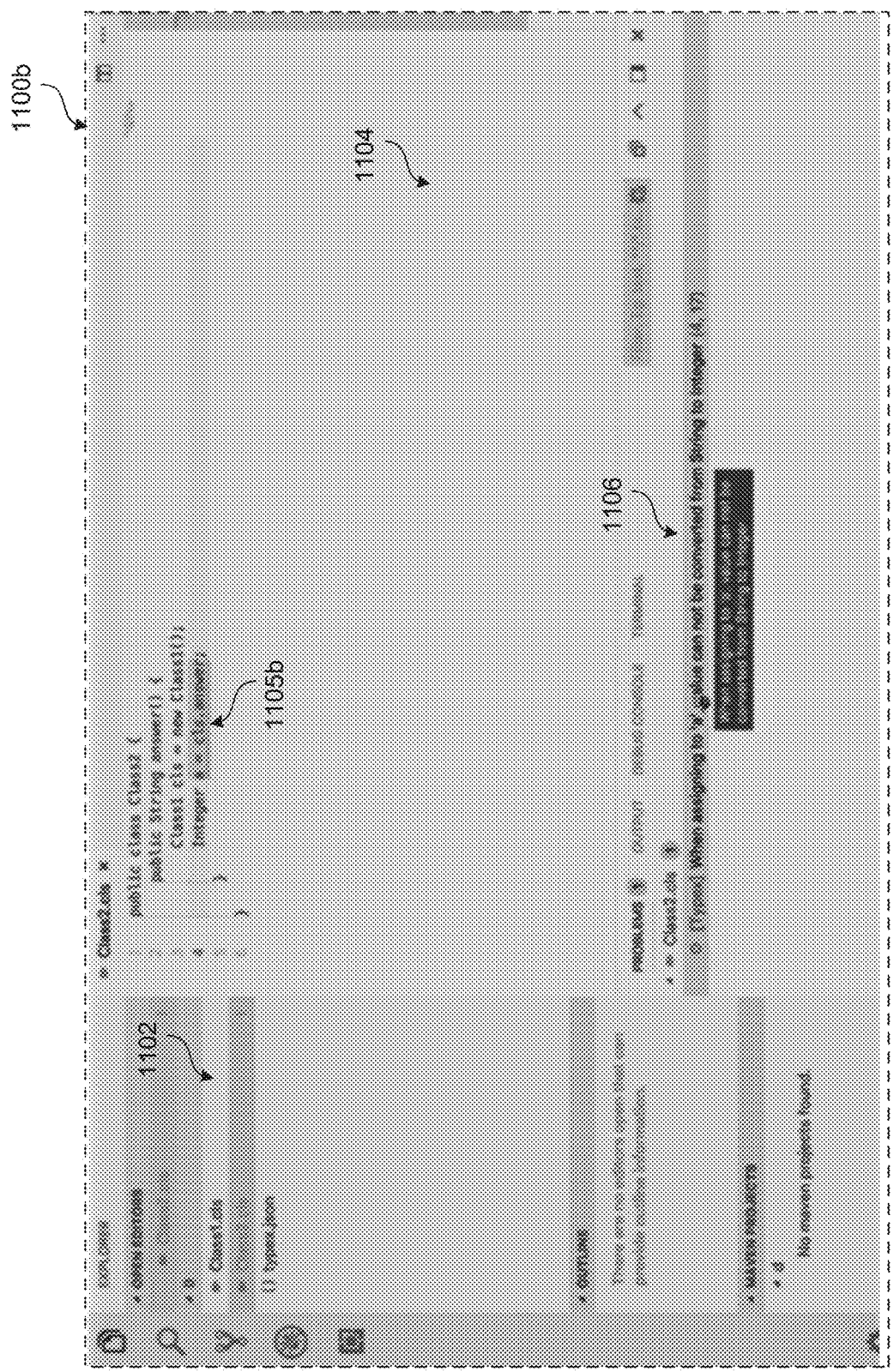

To learn more about the identified error and correct it (if necessary), the developer 203 may interact with one or more different elements in the GUI 402. For example, the developer may interact with the indication of the error displayed in the error reporting element 1106 or the file identifier displayed in the file explorer element 1102, for example, by clicking on the respective interactive elements. FIG. 11B shows a second screen 1100b of the GUI 402 that may be presented to a developer 203, for example, in response to selecting a file identifier via the file explorer element 1102 and/or the indication of the error via the error reporting element 1106. As shown in FIG. 11B, in response to the developer's 203 selection, the text editor element 1104 is updated to display the text of the code in the relevant file, in this example "Class2.cls." Further, in some embodiments, a particular portion of the code causing the error may be highlighted or otherwise indicated via the text editor element 1104. For example, screen 1100b shows a specific portion of the code 1105b relating to the assignment of variable "a" as an integer value as the source of or otherwise associated with the identified error. This portion of code 1105b may be graphically highlighted to the developer 203, for example, by changing the color of the text, highlighting the text, changing the font of the text, etc.

Figure 11C:
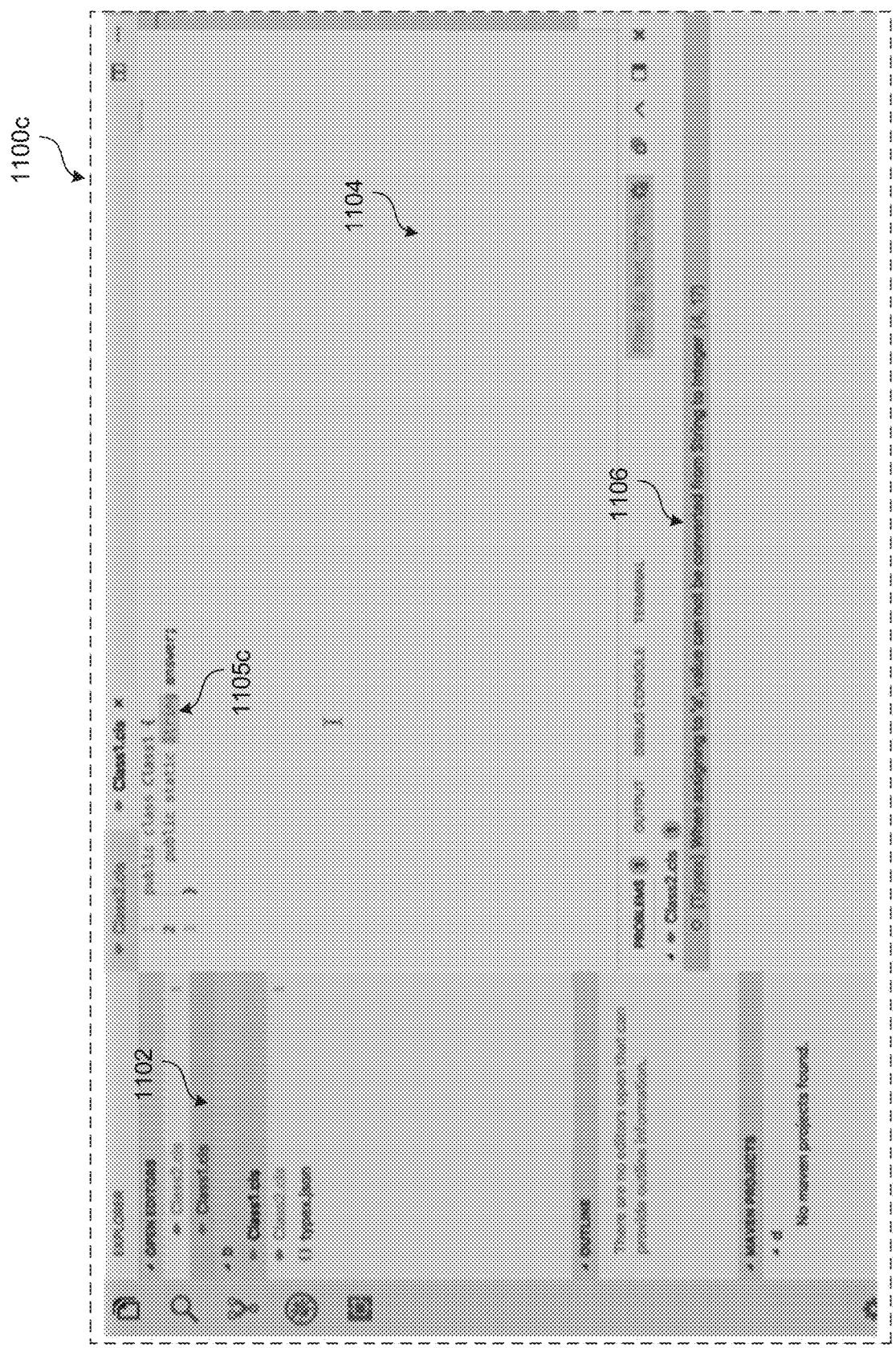

The example type error discussed with respect to FIGS. 11A-11B (i.e., an improper conversion from an integer value to a string value) refers to a type discrepancy between two classes. In other words, while the error may be attributed to one of the two classes, such an error is dependent on the content of another class. A developer user 203 may wish to explore the portions of the code in that other class that are resulting in the error. FIG. 11C shows a third screen 1100c of the GUI 402 that illustrates the highlighting of a portion of the code 1105c in "Class1.cls" even though the error indicated in the error reporting element 1106 is attributed to "Class2.cls." Specifically, in this example, the "String" class callout in code portion 1105c is highlighted to indicate that this portion of the code does not conform with the assignment of "a" as an integer in "Class2.cls."

Figure 11D:
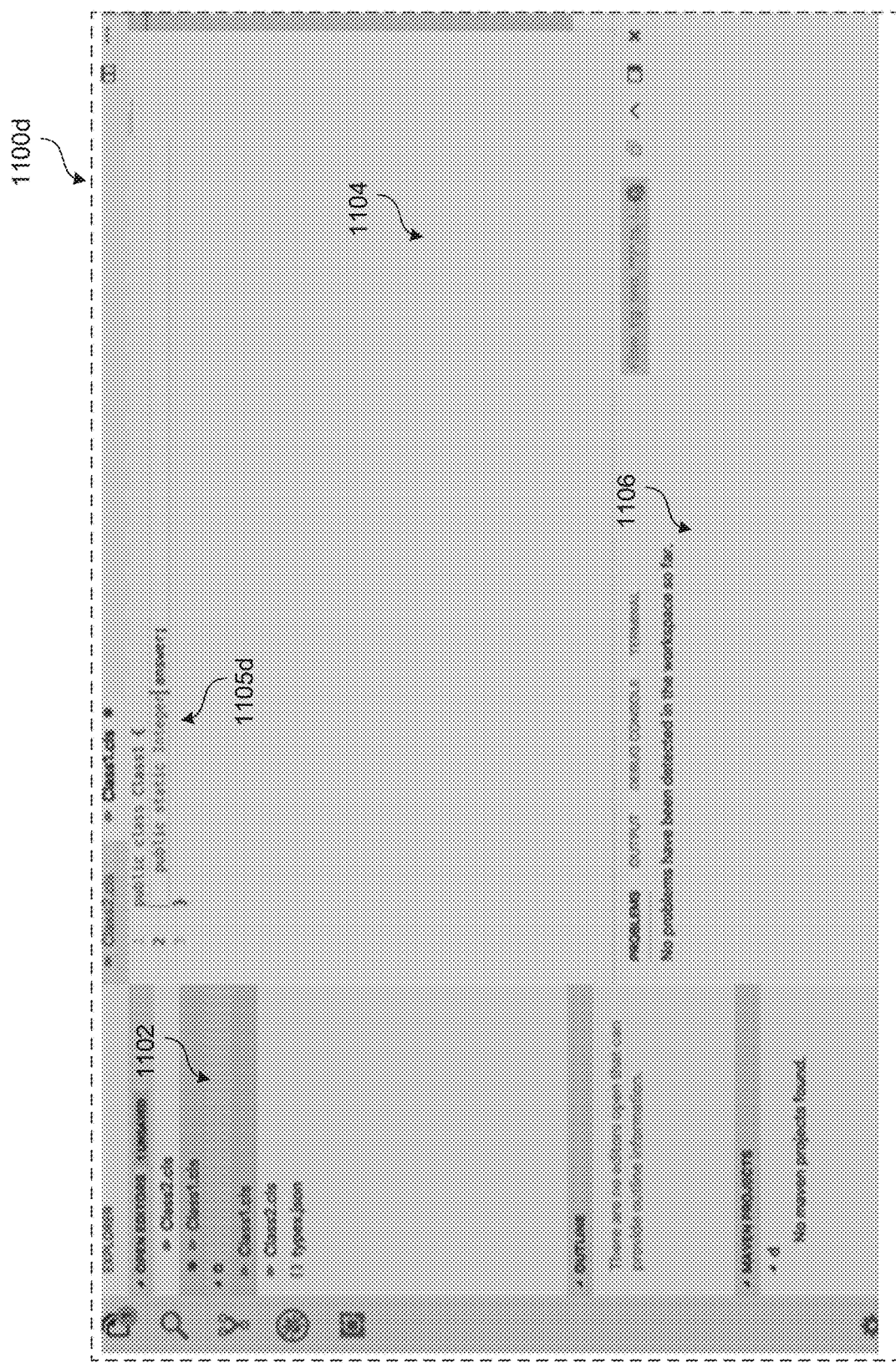

Using the GUI 402 of the code editor 322, the developer 203 can edit the text of the code to correct the one or more errors identified by the code evaluator tool 332. For example, FIG. 11D shows a fourth screen 1100d of the GUI 402 in which the developer 203 has edited the code in "Class1.cls" to change the "String" class callout (shown previously at code portion 1105c) into an "Integer" class callout, for example, as depicted at code portion 1105d. In response to the developer's 203 edit, the code evaluator tool 332 may revalidate and determine that the previously identified error no longer exists. Accordingly, the error identifier previously displayed via the error reporting element 1106 may be removed, for example, as depicted in screen 1100d. In some embodiments, the error reporting element 1106 is updated in real time or near real time in response to user edits via the text editor element 1104 or at least as fast as the loader 532 and validator 522 components can perform their processing.

Example Graphical User Interface—Dependency Analysis

A developer 203 may find it difficult to grasp the nature of inter-class dependencies when working with large-scale codebases that do not have any type of package or modular structure. As previously discussed, a by-product of a class loading and checking process may include the generation of such dependency information, for example, in the form of a dependency map 534. In such embodiments, this dependency information can be presented to the developer 203, for example, via a GUI 402 associated with a code editor 322. For example, dependency information may be retrieved using a language server command which interrogates a generated dependency map 534. The interactive dependency analysis features described below may allow the developer 203 to interactively explore a codebase to, for example, discover why some classes have large quantities of transitive dependencies that may cause undesirable behavior such as "cold starts."

Figure 12:
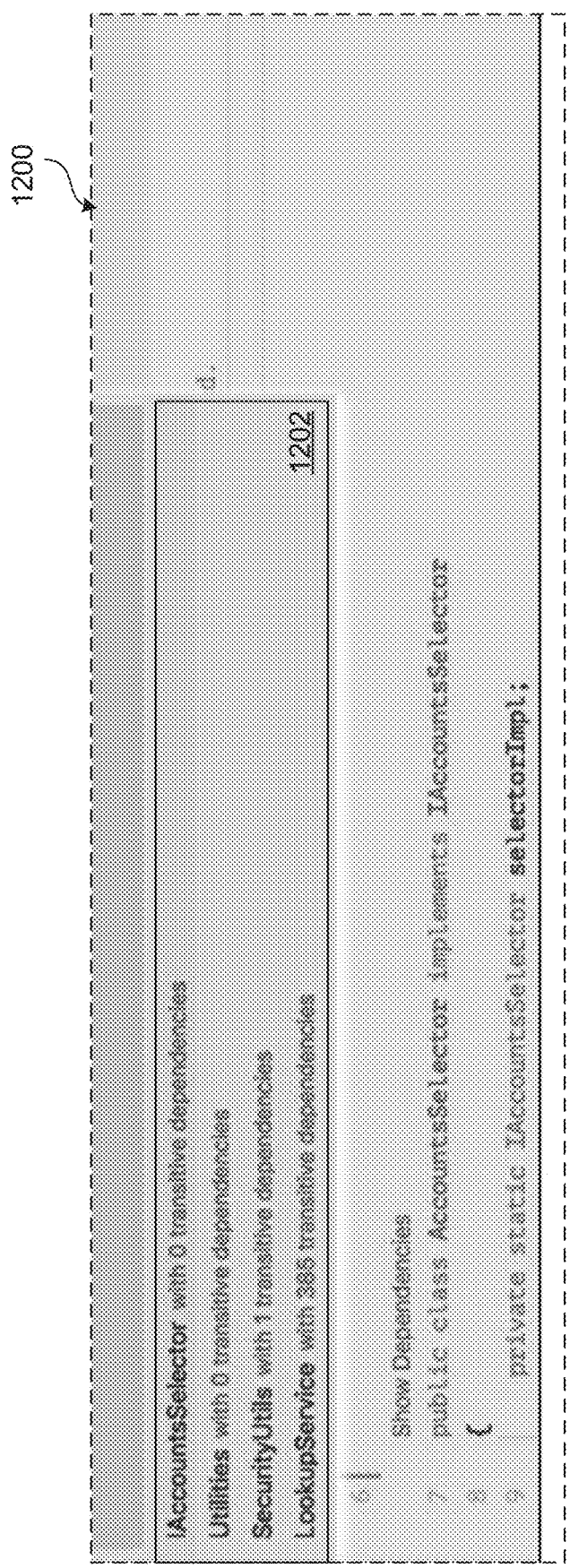
FIG. 12 is a screen capture of an example GUI for displaying dependency information, according to an embodiment of the introduced technique.

FIG. 12 shows a screen 1200 of an example GUI for displaying dependency information to a developer 203. As with the example GUIs described with respect to FIGS. 11A-11D, the example GUI depicted in FIG. 12 may be the GUI 402 associated with a code editor 322. The example screen 1200 depicted in FIG. 12 includes a "show dependencies" option 1202 which, when clicked retrieves a set of one or more dependencies, for example, from a generated dependency map 534, and displays them in a picklist-style user interface element. In this example, the text in option 1202 may link to a language server command which, when clicked, retrieves the dependencies and allows a developer 203 to open the referenced files. In other words, using option 1202, a developer 203 may select a particular noted dependency and be presented with a display of a particular file (e.g., a class file) associated with the particular dependency. For example, as shown in FIG. 12, the option 1202 shows that the class file "SecurityUtils" has 1 transitive dependency. In response to a developer 203 selecting "SecurityUtils" from the list in option 1202, the GUI 402 may display the file (e.g., the class file) that depends from the "SecurityUtils" class file.

The dependency analysis features presented in FIG. 12 are only examples provided for illustrative purposes. A person having ordinary skill in the art will recognize that other GUI features may similarly be implemented to present dependency information to a user such as a developer 203.

Computer System

Figure 13:
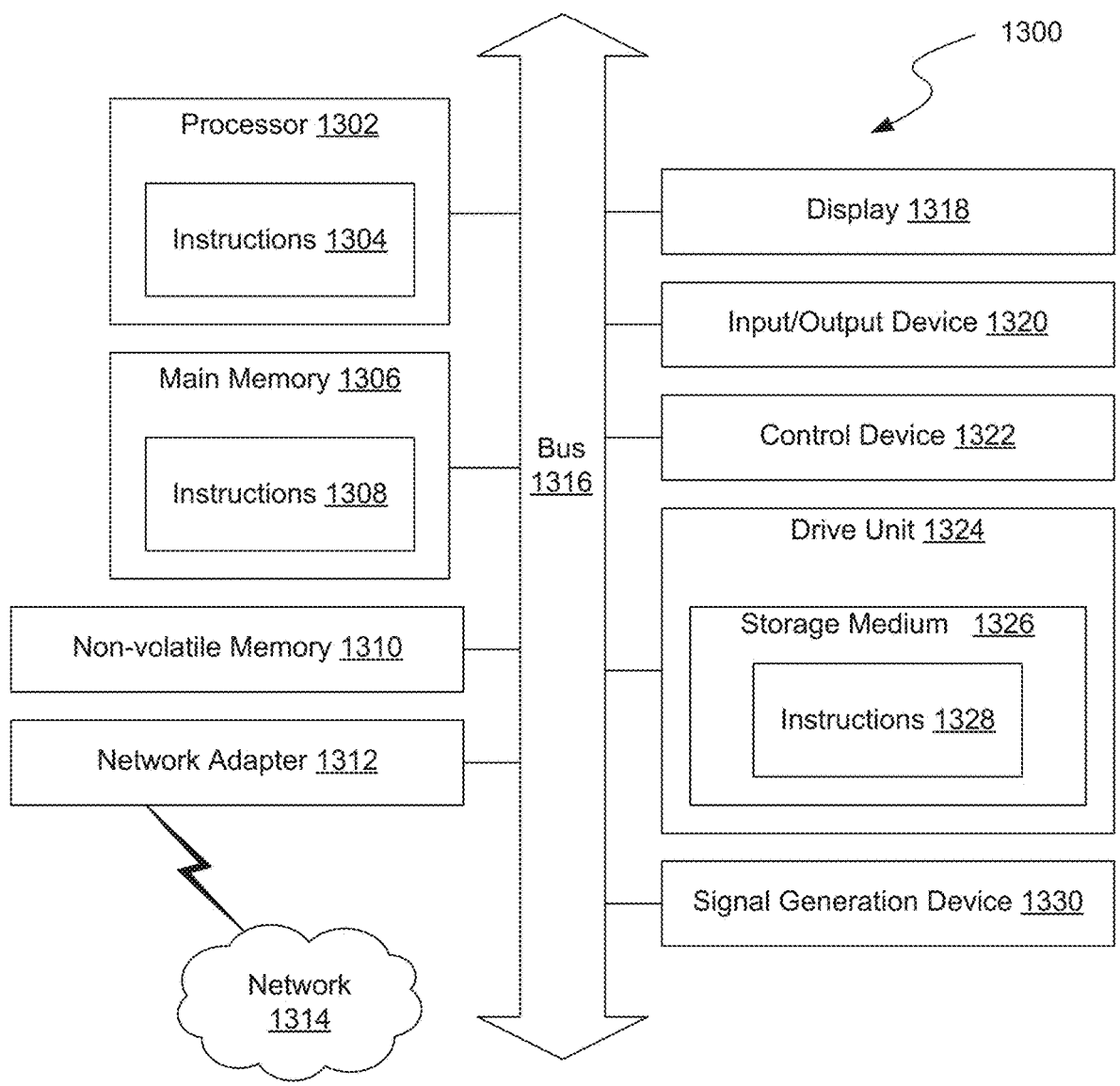
FIG. 13 is a block diagram illustrating an example of a computer system in which at least some operations according to the introduced technique can be implemented.

FIG. 13 is a block diagram illustrating an example of a computer system 1200 in which at least some operations described herein can be implemented. For example, some components of the computer system 1300 may be hosted on any one or more of the devices described with respect to operating environment 100 in FIG. 1 such as computing devices associated with cloud platform 120 (including application server 230 or data store 240), service provider servers 140, or client device 160 (including developer computer devices 260 and end user computer devices 262).

The computer system 1300 may include one or more central processing units ("processors") 1302, main memory 1306, non-volatile memory 1310, network adapter 1312 (e.g., network interface), video display 1318, input/output devices 1320, control device 1322 (e.g., keyboard and pointing devices), drive unit 1324 including a storage medium 1326, and signal generation device 1330 that are communicatively connected to a bus 1316. The bus 1316 is illustrated as an abstraction that represents one or more physical buses and/or point-to-point connections that are connected by appropriate bridges, adapters, or controllers. The bus 1316, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The computer system 1300 may share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the computer system 1300.

While the main memory 1306, non-volatile memory 1310, and storage medium 1326 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 1328. The term "machine-readable medium" and "storage medium" shall also be taken to include any medium that is capable of storing, encoding, or carrying a set of instructions for execution by the computer system 1300.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 1304, 1308, 1328) set at various times in various memory and storage devices in a computing device. When read and executed by the one or more processors 1302, the instruction(s) cause the computer system 1300 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 1310, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 1312 enables the computer system 1300 to mediate data in a network 1314 with an entity that is external to the computer system 1300 through any communication protocol supported by the computer system 1300 and the external entity. The network adapter 1312 can include a network adapter card, a wireless network interface card, a router, an access point, a wireless router, a switch, a multilayer switch, a protocol converter, a gateway, a bridge, a bridge router, a hub, a digital media receiver, and/or a repeater.

The network adapter 1312 may include a firewall that governs and/or manages permission to access/proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method for evaluating source code in a software project based on a cloud computing platform before deploying the source code to be compiled at the cloud computing platform, the method comprising:
   receiving, by a source code analysis tool, a listing of a plurality of class files in the software project, the source code analysis tool executing at a developer computing device that is associated with a developer of the software project, the developer computing device configured to connect to the cloud platform via a computer network, the developer computing device being a local computer system;
   incrementally loading, by the source code analysis tool, the plurality of class files included in the listing;
   parsing, by the source code analysis tool, the source code included in the plurality of class files to identify a plurality of elements in the source code, the source code in a first language that is proprietary to the cloud computing platform;
   generating, by the source code analysis tool, a syntax tree based on the identified plurality of elements in the source code;
   type checking, by the source code analysis tool, the plurality of elements in the source code by analyzing the generated syntax tree;
   converting, at the developer computing device, the source code in the first language associated with the cloud computing platform to or from a second language at the developer computing device;

identifying, by the source code analysis tool, an error in the source code based on the type checking, the source code being implemented in one or both of the first and the second languages; and causing display, by the source code analysis tool, of an indication of the error in the source code in a graphical user interface of a code editor application.

2. A method for locally evaluating code for an application based on a cloud computing platform, before deploying the code to be compiled at the cloud computing platform, using a local computer system that is configured to connect to the cloud platform via a computer network, the method comprising:

loading, by the local computer system, one or more files including the code, the code in a first language that is associated with the cloud computing platform;

parsing, by the local computer system, the code to identify a plurality of elements in the code;

checking, by the local computer system, the plurality of elements in the code;

converting, by the local computer system, the code in the first language associated with the cloud computing platform to a second language at the local computer system;

identifying, by the local computer system, an error in the code at the local computer system based on the checking; and causing display, by the local computer system, of an indication of the error in the code.

3. The method of claim 2, wherein the indication of the error in the code is displayed in real time as the error is identified.

4. The method of claim 2, wherein the loading of the one or more files is performed incrementally and wherein the checking is performed in real time as the one or more files are incrementally loaded.

5. The method of claim 2, wherein the indication of the error in the code is displayed via a graphical user interface (GUI) of a code editor application executed at the computer system.

6. The method of claim 5, wherein causing display of the indication of the error in the code includes transmitting, by a language server, a message to an extension of the code editor application, the message including the indication of the error in the code.

7. The method of claim 5, wherein the GUI of the code editor includes:

a text editor element configured to display text of the code and receive user input to enter or edit the text of the code;

a file explorer element configured to display an interactive listing of the one or more files including the code; and an error reporting element configured to display an interactive listing of identified errors in the code.

8. The method of claim 7, wherein displaying the indication of the error in the code includes any of:

graphically highlighting, in the text editor element, a portion of the code that includes at least one of the identified errors in the code;

graphically highlighting, in the file explorer element, an identifier of a particular file of the one or more files that includes the portion of the code that includes at the least one of the identified errors in the code; or displaying, in the error reporting element, an entry in the interactive listing that describes the identified error.

9. The method of claim 2, wherein identifying the plurality of elements in the code includes:

generating an output indicative of the plurality of elements as a parse tree; and generating a syntax tree (AST) based on the parse tree indicative of the plurality of elements.

10. The method of claim 2, wherein checking the plurality of elements includes type checking.

11. The method of claim 2, wherein the plurality of identified elements in the code include any of statements, variables, identifiers, literals, or operators.

12. The method of claim 2, further comprising:

generating, by the computer system, a dependency map associated with the one or more files based on the checking; and causing display, by the computer system, of an indication of a dependency associated with a particular file of the one or more files.

13. The method of claim 2, wherein the one or more files include class files.

14. The method of claim 2, wherein the local computer system is associated with a third-party developer that does not own, operate, provide, or manage the cloud computing platform.

15. The method of claim 2, wherein the first language is proprietary to the cloud computing platform.

16. The method of claim 2, wherein the code represents a portion of a total codebase utilized to compile the application, and wherein the total codebase is not accessible to the local computer system.

17. The method of claim 2, further comprising:

transpiling, by the local computer system, the code in the first language associated with the cloud computing platform to generate code in another language at the local computer system.

18. The method of claim 17, further comprising:

compiling, by the local computer system, the generated code in the other language to generate a local version of the application; and executing, by the local computer system, the local version of the application.

19. The method of claim 18, wherein the code includes a database query and wherein executing the local version of the application includes causing the database query to be executed at the cloud computing platform.

20. The method of claim 2, further comprising:

transmitting, by the local computer system, via the computer network, to the cloud computing platform, the code for compiling at the cloud computing platform; and receiving, by the local computer system, via the computer network, from the cloud computing platform, a compiling error based on the compiling.

21. The method of claim 2, further comprising:

processing, by the local computer system, the received compiling error using machine learning; and adjusting, by the local computer system, a process for identifying code errors based on the processing.

* * * * *